US012472484B2

(12) United States Patent
Yong et al.

(10) Patent No.: US 12,472,484 B2
(45) Date of Patent: Nov. 18, 2025

(54) WATER-SPLITTING HYDROGEN PRODUCTION PHOTOCATALYST INCLUDING SPATIALLY SEPARATED COCATALYST AND METHOD FOR PRODUCING SAME

(71) Applicant: POSTECH Research and Business Development Foundation, Pohang-si (KR)

(72) Inventors: Kijung Yong, Pohang-si (KR); Hyun Sik Moon, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 483 days.

(21) Appl. No.: 18/068,011

(22) Filed: Dec. 19, 2022

(65) Prior Publication Data

US 2023/0398530 A1    Dec. 14, 2023

(30) Foreign Application Priority Data

Jun. 8, 2022    (KR) ........................ 10-2022-0069703

(51) Int. Cl.
*B01J 21/18* (2006.01)
*B01J 21/06* (2006.01)
(Continued)

(52) U.S. Cl.
CPC .............. *B01J 21/18* (2013.01); *B01J 21/06* (2013.01); *B01J 23/468* (2013.01); *B01J 35/39* (2024.01); *B01J 35/45* (2024.01); *B01J 37/12* (2013.01); *B01J 37/16* (2013.01); *B01J 2523/41* (2013.01); *B01J 2523/47* (2013.01); *B01J 2523/827* (2013.01); *B01J 2523/828* (2013.01)

(58) Field of Classification Search
CPC ... B01J 35/45; B01J 35/39; B01J 21/06; B01J 21/18; B01J 23/468; B01J 37/12; B01J 37/16; B01J 2523/41; B01J 2523/47; B01J 2523/827; B01J 2523/828
USPC ....... 502/326, 350, 306, 308, 310, 311, 313, 502/317, 321, 324, 325; 428/402, 403
See application file for complete search history.

(56) References Cited

U.S. PATENT DOCUMENTS 10,987,659 B1 * 4/2021 Kadi .................... B01J 37/0221

FOREIGN PATENT DOCUMENTS

| CN | 107413364 A | * | 12/2017 | ................ C02F 1/32 |
| CN | 102872774 A | * | 1/2023 | .............. B01J 13/02 |
| JP | 2002143689 A | * | 5/2002 | .............. B01J 35/00 |

OTHER PUBLICATIONS

KIPO, Office Action of KR 10-2022-0069703 dated May 30, 2024.
(Continued)

*Primary Examiner* — Patricia L. Hailey
(74) *Attorney, Agent, or Firm* — LEX IP MEISTER, PLLC

(57) ABSTRACT

Proposed are a water-splitting hydrogen production photocatalyst including spatially separated cocatalysts and a method of preparing the same. The photocatalyst is shaped to be hollow. The photocatalyst includes a first cocatalyst core containing a first cocatalyst, a catalyst layer positioned on the first cocatalyst core and containing a first catalyst and a second catalyst, and a second cocatalyst layer positioned on the catalyst layer and containing a second cocatalyst. The photocatalyst exhibits excellent hydrogen production efficiency and charge transfer efficiency.

14 Claims, 20 Drawing Sheets

(51) Int. Cl.
  *B01J 23/46* (2006.01)
  *B01J 35/39* (2024.01)
  *B01J 35/45* (2024.01)
  *B01J 37/12* (2006.01)
  *B01J 37/16* (2006.01)

(56) References Cited

OTHER PUBLICATIONS

Yao Ding et al., "Rational design of Z-scheme PtS—ZnIn2S4/WO3—MnO2 for overall photo-catalytic water splitting under visible light", Applied Catalysis B: Environmental, 258, 2019, 117948(Jul. 13, 2019).

Zheng Wang et al., "Type-II hetero-junction dual shell hollow spheres loaded with spatially separated cocatalyst for enhancing visible light hydrogen evolution", Nano Energy 38 (2017) 518-525, Jun. 1, 2017.

Baojun Liu et al., "Preparation of ZnS@In2S3 Core@shell Composite for Enhanced Photocatalytic Degradation of Gaseous o-Dichlorobenzene under Visible Light", Scientific Reports, 7, 16396 (Nov. 27, 2017).

* cited by examiner

WATER-SPLITTING HYDROGEN PRODUCTION PHOTOCATALYST INCLUDING SPATIALLY SEPARATED COCATALYST AND METHOD FOR PRODUCING SAME

The present application claims priority to Korean Patent Application No. 10-2022-0069703, filed Jun. 8, 2022, the entire contents of which is incorporated herein for all purposes by this reference.

BACKGROUND OF THE INVENTION

1. Field of the Invention

The present disclosure relates to a photocatalyst for water-splitting hydrogen production, including spatially separated cocatalysts, and a method of preparing the same. More particularly, the present disclosure relates to a water-splitting hydrogen production photocatalyst with excellent hydrogen production efficiency and charge transfer efficiency by having Z-scheme heterogeneous bonding and employing spatial separation of cocatalysts and to a method of preparing the same.

2. Description of the Related Art

Producing hydrogen by splitting water using photocatalysts is considered one of the most promising ways to solve the energy and environmental crisis. However, photocatalytic water-splitting has difficulties in practical application because the energy conversion to produce hydrogen from solar energy is relatively low.

The low efficiency of photocatalytic water-splitting has problems such as inefficient light absorption, inefficient separation and transfer of photogenerated charge carriers, and slow kinetics surface reactions.

Therefore, research on a photocatalyst capable of solving the above problems is required.

SUMMARY OF THE INVENTION

An objective of the present disclosure is to solve the above problems and to provide a photocatalyst for water-splitting hydrogen production with excellent hydrogen production efficiency and charge transfer efficiency and a method for producing the same.

One aspect of the present disclosure provides a photocatalyst for water-splitting hydrogen production including: a first cocatalyst core which is hollow and includes a first cocatalyst; a catalyst layer disposed on the first cocatalyst core and including a first catalyst and a second catalyst; and a second cocatalyst layer disposed on the catalyst layer and including a second cocatalyst.

In addition, the first cocatalyst core may be hollow and may have any one shape selected from the group consisting of a spherical shape, a polygonal shape, a polygonal cone shape, a conical shape, a polygonal columnar shape, a cylindrical shape, and a combination thereof.

In addition, the catalyst layer may be a Z-scheme hetero junction.

In addition, the catalyst layer may include: a first catalyst layer disposed on the first cocatalyst layer and including the first catalyst; and a second catalyst layer disposed on the first catalyst layer and including the second catalyst.

In addition, a difference between a conductive band minimum of the first catalyst and a valence band maximum of the second catalyst may be in a range of 0.1 to 0.75 eV.

In addition, the first catalyst may include at least one selected from the group consisting of titanium oxide, tungsten oxide, niobium oxide, zinc oxide, indium oxide, iron oxide, copper oxide, nickel oxide, tin oxide, and strontium titanate ($SrTiO_3$).

In addition, the second catalyst may include at least one selected from the group consisting of graphitic nitrogen carbide ($g-C_3N_4$), cadmium sulfide, cadmium selenide, zinc sulfide, tantalum nitride, silicon carbide, molybdenum sulfide, and bismuth vanadium ($BiVO_4$).

In addition, one of the first cocatalysts and the second cocatalyst may be an oxidation cocatalyst, and the other of the first cocatalyst and the second cocatalyst may be a reduction cocatalyst.

In addition, the first cocatalyst may be an oxidation cocatalyst, and the second cocatalyst may be a reduction cocatalyst.

In addition, the photocatalyst for water-splitting hydrogen production may include 0.5 to 3 parts by weight of the oxidation cocatalyst based on 100 parts by weight of the photocatalyst for water-splitting hydrogen production.

In addition, the oxidation cocatalyst may include at least one selected from the group consisting of iridium oxide, cobalt oxide, manganese oxide, cobalt hydroxide, ruthenium oxide, and rhodium oxide.

In addition, the photocatalyst for water-splitting hydrogen production may include 0.3 to 3.0 parts by weight of the reduction cocatalyst based on 100 parts by weight of the photocatalyst for water-splitting hydrogen production.

In addition, the reduction cocatalyst may include at least one selected from the group consisting of platinum (Pt), ruthenium (Ru), gold (Au), silver (Ag), copper (Cu), nickel (Ni), cobalt (Co), palladium (Pd), iron (Fe), and rhodium (Rh).

In addition, the photocatalyst for water-splitting hydrogen production may split water under light irradiation to produce a gas including hydrogen.

Another aspect of the present disclosure provides a method of producing photocatalyst for water-splitting hydrogen production, the method including: (a) preparing metal oxide nanoparticle; (b) forming a first cocatalyst layer including a first cocatalyst on the surface of the metal oxide nanoparticle; (c) foaming a catalyst layer including a first catalyst and a second catalyst on the first cocatalyst layer; (d) foaming a second cocatalyst layer including a second cocatalyst on the catalyst layer; and (e) foaming a first cocatalyst core including a first cocatalyst by etching the metal oxide nanoparticle into a hollow structure.

In addition, the metal oxide nanoparticle may include at least one selected from the group consisting of silicon oxide ($SiO_2$) and carbon structures.

In addition, the step (c) may include: (c-1) forming a first catalyst layer including a first catalyst on the first cocatalyst layer; and (c-2) forming a second catalyst layer including a second catalyst on the first catalyst layer.

In addition, the first cocatalyst may be positioned on a portion of the surface of the metal oxide nanoparticle, the first catalyst layer may be formed by an electrostatic attraction between the first catalyst and the surface of the metal oxide nanoparticle, and the second catalyst layer may be formed by an electrostatic attraction between the second catalyst and a surface of the first catalyst layer.

Another aspect of the present disclosure provides a method of hydrogen production, the method including: (1)

dispersing a photocatalyst for water-splitting hydrogen production in water; and (2) producing a gas including hydrogen ($H_2$) by irradiating the water in which the photocatalyst is dispersed with light.

In addition, in the step (2), the gas may further include oxygen ($O_2$).

The photocatalyst for water-splitting hydrogen production of the present disclosure has the effect of having excellent hydrogen production efficiency and charge transfer efficiency.

In addition, the photocatalyst for water-splitting hydrogen production of the present disclosure may simultaneously produce hydrogen and oxygen in high yield, respectively.

BRIEF DESCRIPTION OF THE DRAWINGS

Since the accompanying drawings are for reference in describing exemplary embodiments of the present disclosure, the technical spirit of the present disclosure should not be construed as being limited to the accompanying drawings.

DESCRIPTION OF THE PREFERRED EMBODIMENTS

Hereinafter, examples of the present disclosure will be described in detail with reference to the accompanying drawings in such a manner that the ordinarily skilled in the art can easily implement the present disclosure.

The description given below is not intended to limit the present disclosure to specific embodiments. In relation to describing the present disclosure, when the detailed description of the relevant known technology is determined to unnecessarily obscure the gist of the present disclosure, the detailed description may be omitted.

The terminology used herein is for the purpose of describing particular embodiments only and is not intended to limit the scope of the present disclosure. As used herein, the singular forms "a", "an", and "the" are intended to include the plural forms as well unless the context clearly indicates otherwise. It will be further understood that the teams "comprise" or "have", when used in this specification, specify the presence of stated features, integers, steps, operations, elements and/or combinations thereof, but do not preclude the presence or addition of one or more other features, integers, steps, operations, elements, and/or combinations thereof.

Terms including ordinal numbers used in the specification, "first", "second", etc., can be used to discriminate one component from another component, but the order or priority of the components is not limited by the teams unless specifically stated. The teams are used only for the purpose of distinguishing one component from another component. For example, without departing from the scope of the present disclosure, a first component may be referred to as a second component, and similarly, a second component may also be referred to as a first component.

In addition, when it is mentioned that a component is "foamed" or "stacked" on another component, it should be understood such that one component may be directly attached to or directly stacked on the front surface or one surface of the other component, or an additional component may be disposed between them.

Hereinafter, a photocatalyst for water-splitting hydrogen production including spatially separated cocatalysts and a producing method thereof will be described in detail. However, those are described as examples, and the present disclosure is not limited thereto and is only defined by the scope of the appended claims.

Figure 1:
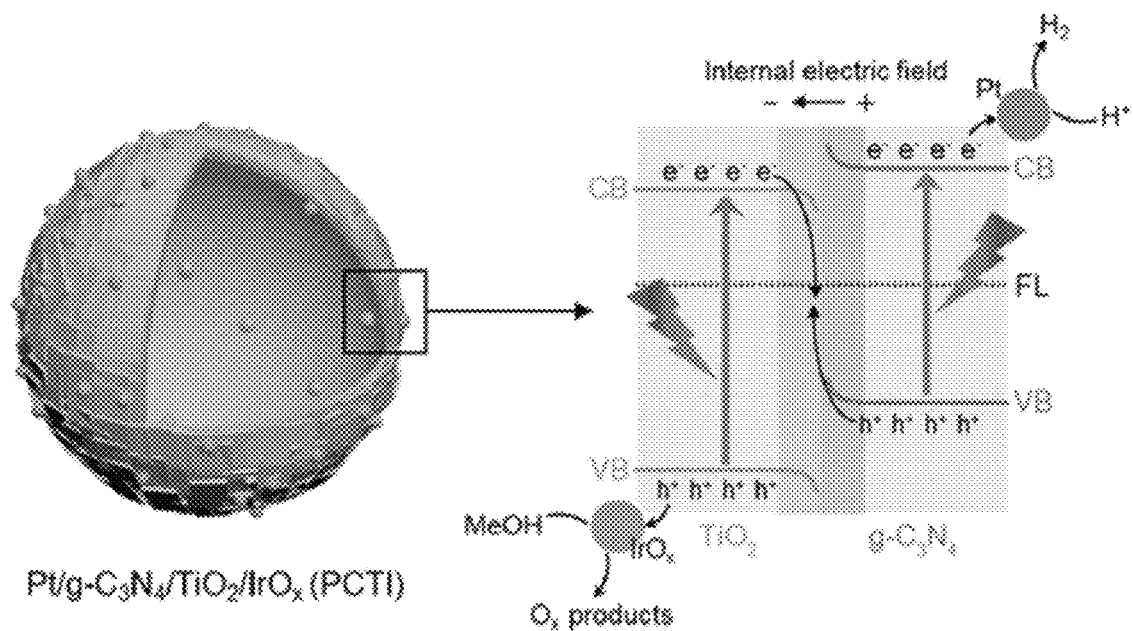
FIG. 1 is a schematic diagram of a photocatalyst for water-splitting hydrogen production prepared according to one embodiment of the present disclosure and a schematic diagram of a charge transfer process inside the photocatalyst.

FIG. 1 is a schematic diagram of a photocatalyst for water-splitting hydrogen production prepared according to one embodiment of the present disclosure and a schematic diagram of a charge transfer process inside the photocatalyst.

Referring to FIG. 1, provided is a photocatalyst for water-splitting hydrogen production, the photocatalyst including: a first cocatalyst core which is hollow and includes a first cocatalyst; a catalyst layer disposed on the first cocatalyst core and including a first catalyst and a second catalyst; and a second cocatalyst layer disposed on the catalyst layer and including a second cocatalyst.

In addition, the first cocatalyst core may be hollow and may have any one shape selected from the group consisting of a spherical shape, a polygonal shape, a polygonal cone shape, a conical shape, a polygonal columnar shape, a cylindrical shape, and a combination thereof.

In addition, the catalyst layer may be a Z-scheme heterojunction.

In addition, the catalyst layer may include: a first catalyst layer disposed on the first cocatalyst layer and including the first catalyst; and a second catalyst layer disposed on the first catalyst layer and including the second catalyst.

In addition, the difference between the conduction band minimum of the first catalyst and the valence band maximum of the second catalyst may be in a range of 0.1 to 0.75 eV, preferably 0.1 to 0.5 eV. When the difference is less than 0.1 eV, electron transfer between heterojunctions is impossible, which is undesirable, and when it exceeds 0.75 eV, charge transfer of type II, not Z-scheme, occurs at the heterogeneous bonding interface of the first catalyst and the second catalyst, and thus it is difficult to use that catalyst as a photocatalyst for water-splitting hydrogen production.

In addition, the first catalyst may include at least one selected from the group consisting of titanium oxide, tungsten oxide, niobium oxide, zinc oxide, indium oxide, iron oxide, copper oxide, nickel oxide, tin oxide, and strontium titanate ($SrTiO_3$), and preferably may include titanium oxide.

In addition, the second catalyst may include at least one selected from the group consisting of graphitic nitrogen carbide (g-$C_3N_4$), cadmium sulfide, cadmium selenide, zinc sulfide, tantalum nitride, silicon carbide, molybdenum sulfide, and bismuth vanadium ($BiVO_4$), and preferably may include graphitic nitrogen carbide.

In addition, one of the first cocatalysts and the second cocatalyst may be an oxidation cocatalyst, and the other of the first cocatalyst and the second cocatalyst may be a reduction cocatalyst.

In addition, the first cocatalyst may be an oxidation cocatalyst, and the second cocatalyst may be a reduction cocatalyst.

In addition, the photocatalyst for water-splitting hydrogen production may include 0.5 to 3.0 parts by weight of the oxidation cocatalyst based on 100 parts by weight of the photocatalyst for water-splitting hydrogen production. When the oxidation cocatalyst is included in an amount of less than parts by weight, the amount of the oxidation cocatalyst is small and the effect generated by including the oxidation cocatalyst is insignificant, which is not preferable, and when the oxidation cocatalyst is included in an amount of more than 3.0 parts by weight, it is not preferable because the ratio of the increase in effect to the amount of the oxidation cocatalyst is small and economically inefficient.

In addition, the oxidation cocatalyst may include at least one selected from the group consisting of iridium oxide, cobalt oxide, manganese oxide, cobalt hydroxide, ruthenium oxide, and rhodium oxide, and preferably may include iridium oxide.

In addition, the photocatalyst for water-splitting hydrogen production may include 0.3 to 3.0 parts by weight of the reduction cocatalyst based on 100 parts by weight of the photocatalyst for water-splitting hydrogen production. When the reduction cocatalyst is included in an amount of less than parts by weight, the amount of the reduction cocatalyst is small and the effect generated by including the reduction cocatalyst is insignificant, which is not preferable, and when the reduction cocatalyst is included in an amount of more than 3.0 parts by weight, it is not preferable because the ratio of the increase in effect to the amount of the reduction cocatalyst is small and economically inefficient.

In addition, the reduction cocatalyst may include at least one selected from the group consisting of platinum (Pt), ruthenium (Ru), gold (Au), silver (Ag), copper (Cu), nickel (Ni), cobalt (Co), palladium (Pd), iron (Fe), and rhodium (Rh), and preferably may include platinum (Pt).

In addition, the photocatalyst for water-splitting hydrogen production may split water under light irradiation to produce a gas including hydrogen.

Figure 2A:
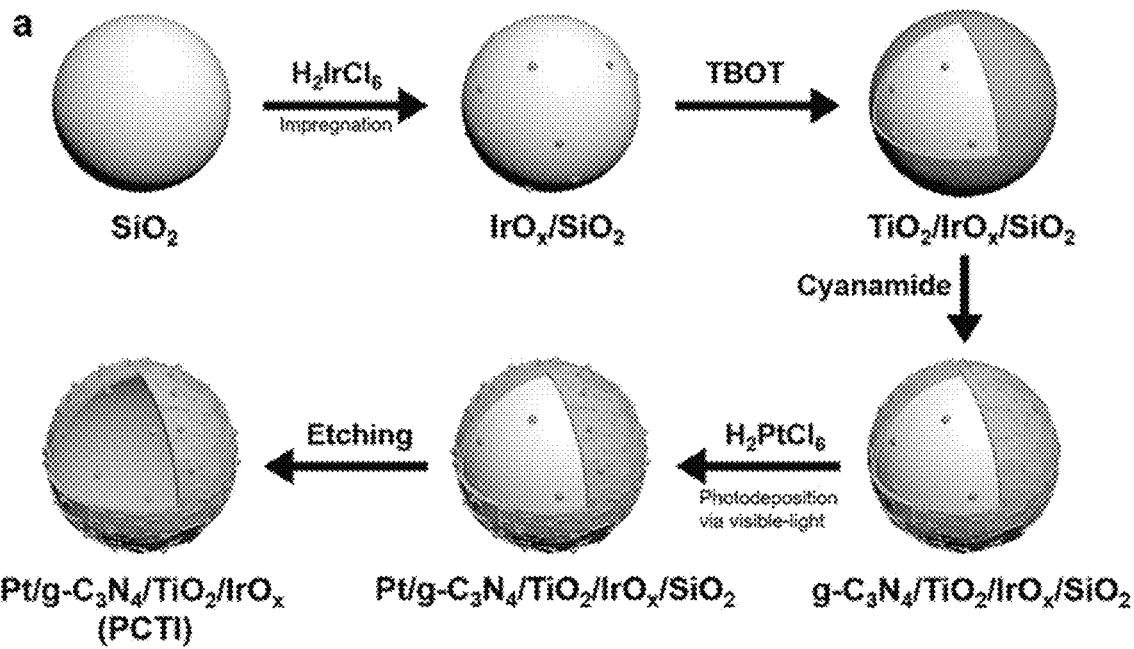
FIG. 2A is a schematic diagram showing a process for preparing a photocatalyst for water-splitting hydrogen production according to an embodiment of the present disclosure.

FIG. 2A is a schematic diagram showing a process for preparing a photocatalyst for water-splitting hydrogen production according to an embodiment of the present disclosure.

Referring to FIG. 2A, provided is a method of producing photocatalyst for water-splitting hydrogen production, the method including: (a) preparing metal oxide nanoparticle; (b) forming a first cocatalyst layer including a first cocatalyst on the surface of the metal oxide nanoparticle; (c) foaming a catalyst layer including a first catalyst and a second catalyst on the first cocatalyst layer; (d) foaming a second cocatalyst layer including a second cocatalyst on the catalyst layer; and (e) forming a first cocatalyst core including a first cocatalyst by etching the metal oxide nanoparticle into a hollow structure.

In addition, the metal oxide nanoparticle may include at least one selected from the group consisting of silicon oxide ($SiO_2$) and carbon structures (carbon, C), and may preferably include silicon oxide.

In addition, the step (c) may include: (c-1) forming a first catalyst layer including a first catalyst on the first cocatalyst layer; and (c-2) forming a second catalyst layer including a second catalyst on the first catalyst layer.

In addition, the first cocatalyst may be positioned on a portion of the surface of the metal oxide nanoparticle, the first catalyst layer may be formed by an electrostatic attraction between the first catalyst and the surface of the metal oxide nanoparticle, and the second catalyst layer may be formed by an electrostatic attraction between the second catalyst and a surface of the first catalyst layer.

The present disclosure provides a method of hydrogen production, the method including: (1) dispersing a photocatalyst for water-splitting hydrogen production in water; and (2) producing a gas including hydrogen ($H_2$) by irradiating the water in which the photocatalyst is dispersed with light.

In addition, in the step (2), the gas may further include oxygen ($O_2$).

EXAMPLE

Hereinafter, a preferred example of the present disclosure will be described. However, the example is for illustrative purposes, and the scope of the present disclosure is not limited thereto.

Production of Photocatalyst for Water-Splitting Hydrogen Production

Example 1

FIG. 1 is a schematic diagram of a photocatalyst for water-splitting hydrogen production prepared according to one embodiment of the present disclosure and FIG. 2A is a schematic diagram showing a process for producing a photocatalyst for water-splitting hydrogen production according to one embodiment of the present disclosure. A photocatalyst for water-splitting hydrogen production of Example 1 was prepared with reference to FIGS. 1 and 2A.

Preparation of Spherical $SiO_2$ Nanoparticle $SiO_2$ nanoparticle with a spherical shape were prepared by slightly modifying the classical Stover method.

First, tetraethyl orthosilicate (TEOS, ≥98%) was hydrolyzed in an ethanol medium containing deionized water and ammonia. The above TEOS (7.5 mL) and $NH_4OH$ (30 mL) were mixed with absolute ethanol (50 mL) with continuous stirring at room temperature for 6 hours to foam a white $SiO_2$ colloidal suspension. After annealing the suspension at 800° C. for 1 hour, the silica particles were centrifuged and washed with deionized water and ethanol to prepare spherical $SiO_2$ nanoparticle.

Figure 3A:
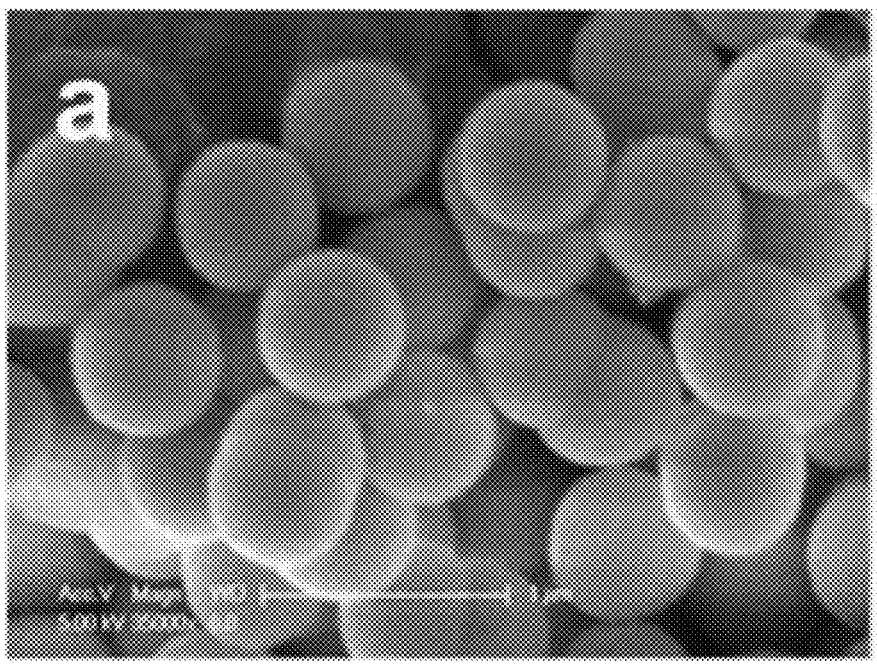
FIG. 3A is a TEM image of $IrO_x/SiO_2$ prepared in the process of preparing a photocatalyst according to Example 1.

$IrO_x/SiO_2$ Production 50 mg of the $SiO_2$ nanoparticle was dispersed in 100 mL of an aqueous solution containing $H_2IrCl_6·6H_2O$ (4.0 mg), evaporated in a water bath at 80° C. under stirring, and calcined at 450° C. in the air for 4 hours to produce $IrO_x/SiO_2$. Thereafter, the $IrO_x/SiO_2$ was washed with deionized water and ethanol to remove unnecessary residues and dried in an oven for 12 hours. At this time, the loading amount of $IrO_x$ was determined to be 1.2 wt % by ICP-AES, and a TEM image of the produced $IrO_x/SiO_2$ can be seen in FIG. 3A.

Figure 3B:
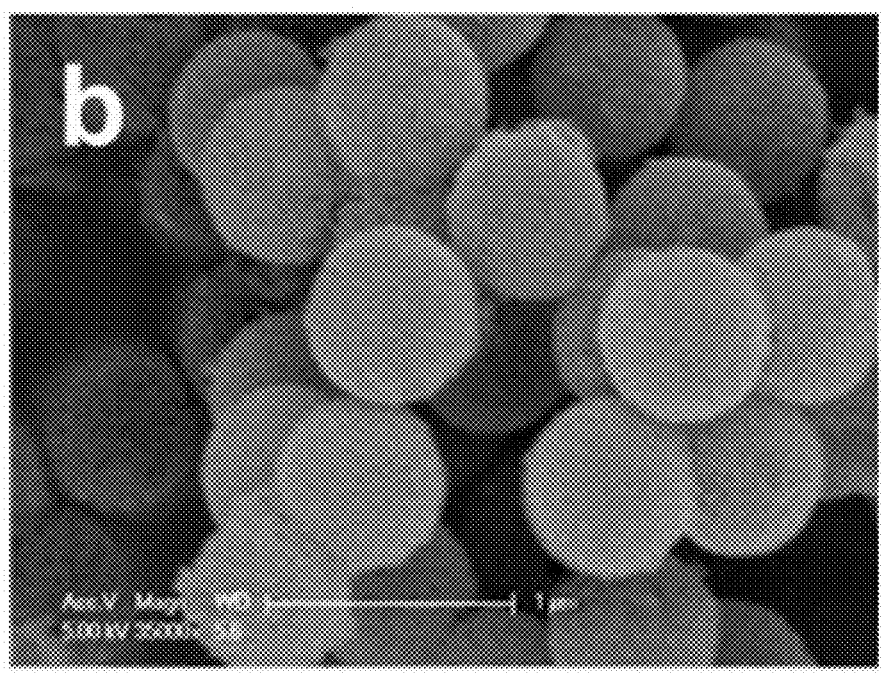
FIG. 3B is a TEM image of $TiO_2/IrO_x/SiO_2$ prepared in the process of preparing a photocatalyst according to Example 1.

$TiO_2/IrO_x/SiO_2$ Production 0.25 g of the above $IrO_x/SiO_2$ was dispersed in ethanol (450 mL) and sonicated for 20 minutes to foam a suspension. $NH_4$ OH (1.75 mL) and tetrabutyl titanate (TBOT, ≥99.0%) were then added to the suspension. The suspension was stirred in a water bath controlled at 45° C. for 24 hours, then centrifuged and washed several times with deionized water and ethanol. Thereafter, the obtained sample was dried in an oven at 60° C. for 12 hours and then calcined in air at 700° for 2 hours to produce $TiO_2/IrO_x/SiO_2$. A TEM image of the produced $TiO_2/IrO_x/SiO_2$ can be seen in FIG. 3B.

$g-C_3N_4/TiO_2/IrO_x/SiO_2$ Production 0.2 g of $TiO_2/IrO_x/SiO_2$, 0.7 g of cyanamide, and 100 mL of absolute ethanol were sonicated for 30 minutes, and then 0.5 mL of HCl was added. After stirring at room temperature for a further 30 minutes, the mixture was dried at 70° C. while stirring. Thereafter, by annealing at 550° C. for 4.5 hours, $g-C_3N_4/TiO_2/IrO_x/SiO_2$ was prepared. A TEM image of the produced $g-C_3N_4/TiO_2/IrO_x/SiO_2$ can be seen in FIG. 3B.

$Pt/g-C_3N_4/TiO_2/IrO_x/SiO_2$ Production

Pt loading was performed using the photo deposition method in a 115 ml Pyrex reactor. 50 mg of $g-C_3N_4/TiO_2/IrO_x/SiO_2$ was dispersed in an aqueous methanol (100 mL, 20 vol %) solution containing an aqueous $H_2PtCl_6$ solution (350 μL, 1 mg/mL). The reactor was purged with argon for 1 hour prior to the light deposition reaction to remove residual air. Subsequently, the dispersion was irradiated under visible light (λ>420 nm) for hours to sufficiently reduce Pt ions. Finally, the product was obtained by centrifugation, washed several times with deionized water, and dried for 12 hours. At this time, the Pt loading amount was determined to be 0.5 wt % by ICP-AES.

Production of Pt/g-$C_3N_4$/$TiO_2$/$IrO_x$/Core (Void) Catalyst

An etching process was performed to remove $SiO_2$ from the Pt/g-$C_3N_4$/$TiO_2$/$IrO_x$/$SiO_2$. 0.1 g of Pt/g-$C_3N_4$/$TiO_2$/$IrO_x$/$SiO_2$ was dispersed in 10 mL deionized water under sonication for 10 minutes. Thereafter, a NaOH solution (10 mL, 5 mol/L) was added to the suspension, and an etching reaction was performed at 90° C. for 4 hours while stirring.

Etched samples were centrifuged and washed several times with water and ethanol. The obtained sample was dried at 60° C. for 12 hours to prepare a Pt/g-$C_3N_4$/$TiO_2$/$IrO_x$/core (void) photocatalyst. A TEM image of the prepared Pt/g-$C_3N_4$/$TiO_2$/$IrO_x$/core (void) photocatalyst can be seen in FIG. 3D.

Comparative Examples 1 to 11

Figure 7A:
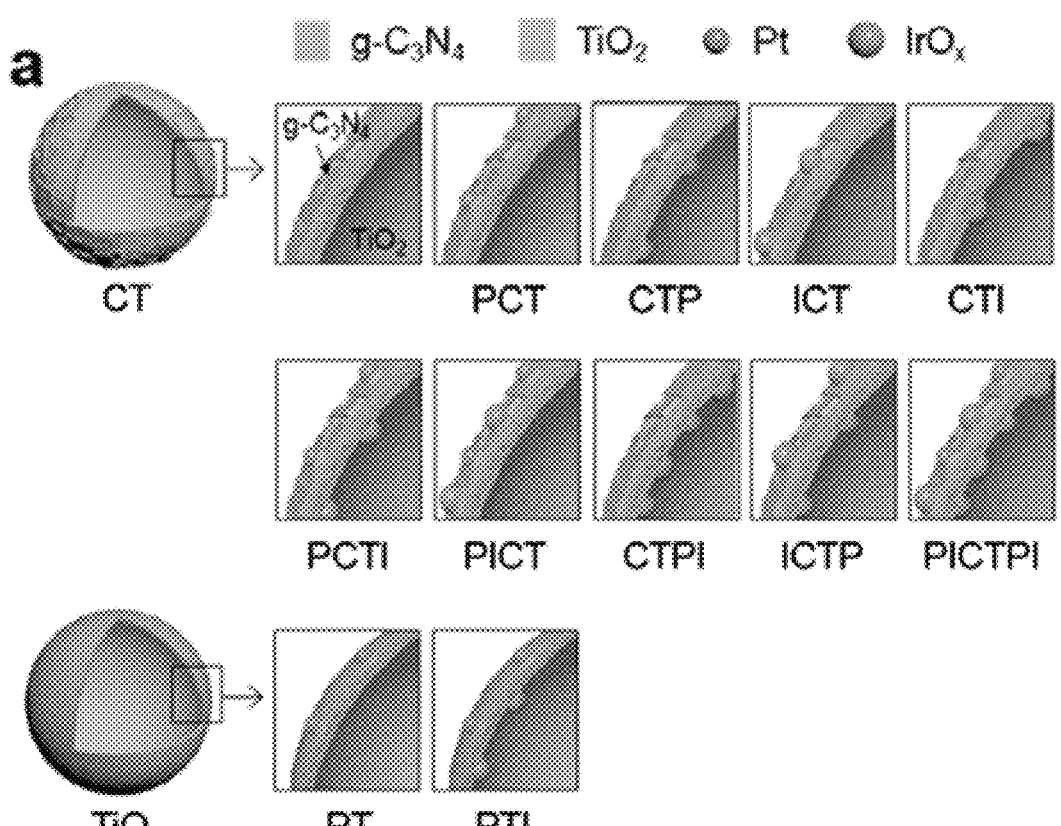
FIG. 7A is a schematic diagram of photocatalysts prepared according to Example 1 and Comparative Examples 1 to 11.

FIG. 7A is a schematic diagram of photocatalysts prepared according to Example 1 and Comparative Examples 1 to 11. Specifically, while Example 1 was prepared in the order of $SiO_2$ production, $IrO_x$ formation, $TiO_2$ formation, g-$C_3N_4$ formation, Pt formation, and $SiO_2$ etching, Comparative Examples 1 to 11 were prepared in the order of preparation as shown in Table 1 below, except that a photocatalyst was prepared in the same manner as in Example 1.

At this time, in Comparative Examples 10 and 11, where Pt was placed on $TiO_2$, $SiO_2$ nanoparticle having a spherical shape were impregnated with a certain amount of platinum chloride in water, and the complex of $SiO_2$ was heated and reduced in $H_2$ at 200° C. for 4 hours to form metal particles.

TABLE 1

| Division | Step 1: | Step 2: | Step 3: | Step 4: | Step 5: | Step 6: |
|---|---|---|---|---|---|---|
| Example 1 (PCTI) | $SiO_2$ formation | $IrO_x$ formation | $TiO_2$ formation | g-$C_3N_4$ formation | Pt formation | $SiO_2$ etching |
| Comparative Example 1 (CT) | $SiO_2$ formation | $TiO_2$ formation | g-$C_3N_4$ formation | $SiO_2$ etching | — | — |
| Comparative Example 2 (PCT) | $SiO_2$ formation | $TiO_2$ formation | g-$C_3N_4$ formation | Pt formation | $SiO_2$ etching | — |
| Comparative Example 3 (CTP) | $SiO_2$ formation | Pt formation | $TiO_2$ formation | g-$C_3N_4$ formation | $SiO_2$ etching | — |
| Comparative Example 4 (ICT) | $SiO_2$ formation | $TiO_2$ formation | g-$C_3N_4$ formation | $IrO_x$ formation | $SiO_2$ etching | — |
| Comparative Example 5 (CTI) | $SiO_2$ formation | $IrO_x$ formation | $TiO_2$ formation | g-$C_3N_4$ formation | $SiO_2$ etching | — |
| Comparative Example 6 (PICT) | $SiO_2$ formation | $TiO_2$ formation | g-$C_3N_4$ formation | $IrO_x$ and Pt formation | $SiO_2$ etching | — |
| Comparative Example 7 (CTP) | $SiO_2$ formation | $IrO_x$ and Pt formation | $TiO_2$ formation | g-$C_3N_4$ formation | $SiO_2$ etching | — |
| Comparative Example 8 (ICT) | $SiO_2$ formation | Pt formation | $TiO_2$ formation | g-$C_3N_4$ formation | $IrO_x$ formation | $SiO_2$ etching |
| Comparative Example 9 (PICTPI) | $SiO_2$ formation | $IrO_x$ and Pt formation | $TiO_2$ formation | g-$C_3N_4$ formation | $IrO_x$ and Pt formation | $SiO_2$ etching |
| Comparative Example 10 (PT) | $SiO_2$ formation | $TiO_2$ formation | Pt formation | $SiO_2$ etching | — | — |
| Comparative Example 11 (PTI) | $SiO_2$ formation | $IrO_x$ formation | $TiO_2$ formation | Pt formation | $SiO_2$ etching | — |

EXPERIMENTAL EXAMPLE

Experimental Example 1: Structure Confirmation of Photocatalyst for Water-Splitting Hydrogen Production According to Example 1

Figure 2B:
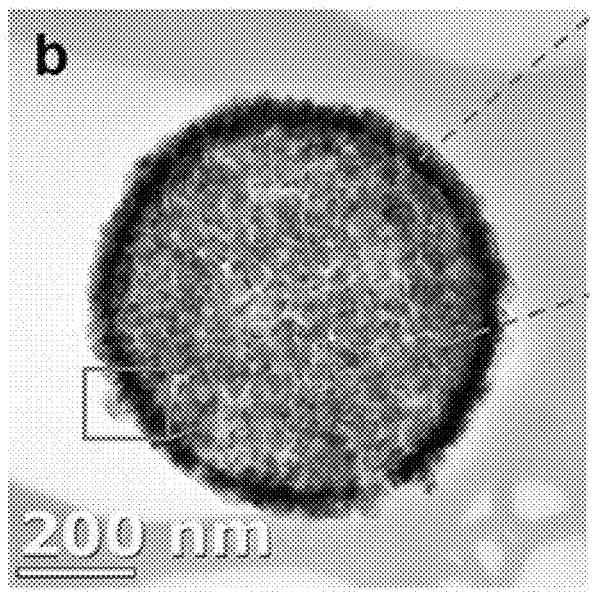
FIG. 2B shows a TEM image of a photocatalyst for water-splitting hydrogen production prepared according to Example 1.

FIG. 2B shows a TEM image of a photocatalyst for water-splitting hydrogen production prepared according to Example 1.

According to FIG. 2B, it can be seen that the photocatalyst for water-splitting hydrogen production prepared according to Example 1 has a hollow sphere structure with a diameter of about 600 nm.

Figure 2C:
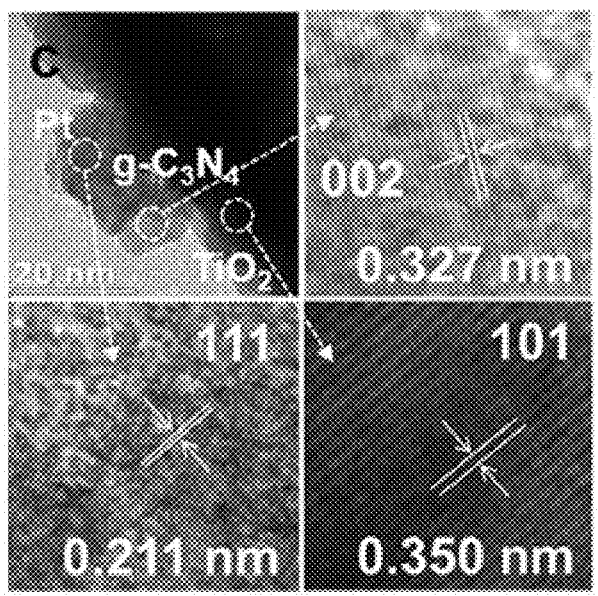
FIG. 2C shows a high-resolution TEM (HRTEM) image of the photocatalyst for water-splitting hydrogen production prepared according to Example 1.

FIG. 2C shows a high-resolution TEM (HRTEM) image of the photocatalyst for water-splitting hydrogen production prepared according to Example 1.

According to FIG. 2C, the outer and inner layers have lattice spacings of 0.327±0.01 and 0.350±0.01 nm, respectively, which are consistent with the (002) plane of g-$C_3N_4$ and the (101) plane of anatase $TiO_2$, respectively. The dark grains of g-$C_3N_4$ have a lattice spacing of 0.211±0.02 nm, which can be assigned to the Pt (111) plane.

Figure 2D:
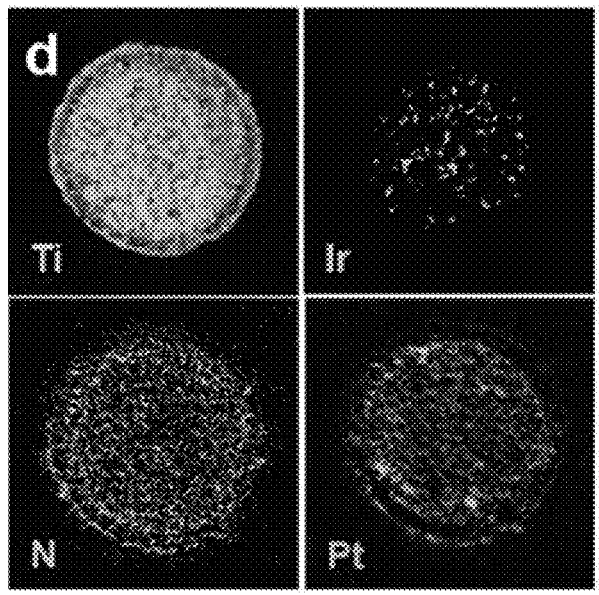
FIG. 2D shows ELLS mapping of Ti, Ir, N, and Pt signals of the photocatalyst for water-splitting hydrogen production prepared according to Example 1.

FIG. 2D shows ELLS mapping of Ti, Ir, N, and Pt signals of the photocatalyst for water-splitting hydrogen production prepared according to Example 1.

According to FIG. 2D, it can be seen that the Ti, N, and Pt distributions of Example 1 match the shape shown in FIG. 1B. However, it can be confirmed that the distribution of N and Pt is less dense than that of Ti due to the thin thickness of the g-$C_3N_4$ layer and partial aggregation of Pt. On the other hand, since $IrO_x$ exists on the inner surface of $TiO_2$, it can be seen that the distribution part of Ir is more limited than the other three elements (Ti, N, Pt).

Since the carbon distribution of g-$C_3N_4$ was not clearly observed due to the carbon source of the TEM grid, a cross-sectional structure of the photocatalyst for water-splitting hydrogen production prepared according to Example 1 was additionally investigated using a target surfacing system (TXP) and precision polishing (PIP).

Figure 2E:
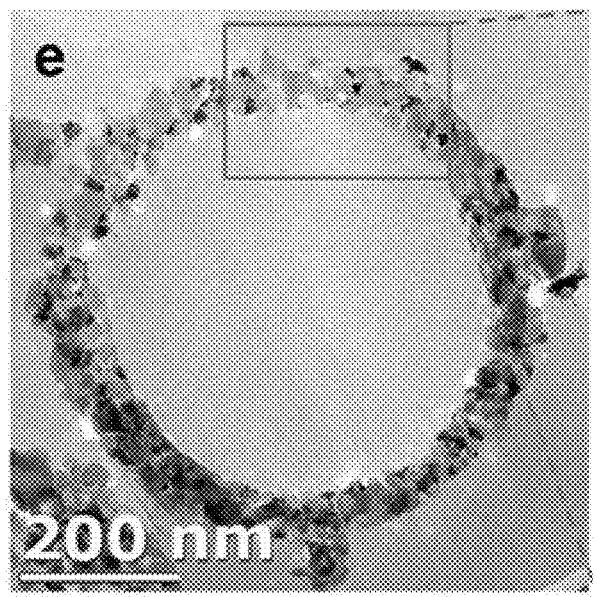
FIG. 2E shows the cross-sectional structure of the photocatalyst of Example 1 treated with TXP and PIP.
Figure 2F:
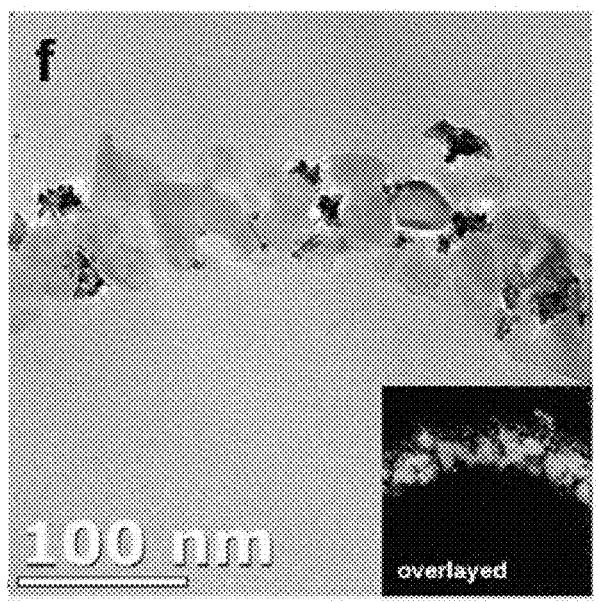
FIG. 2F is an enlarged TEM image of the square portion of FIG. 2E.
Figure 2G:
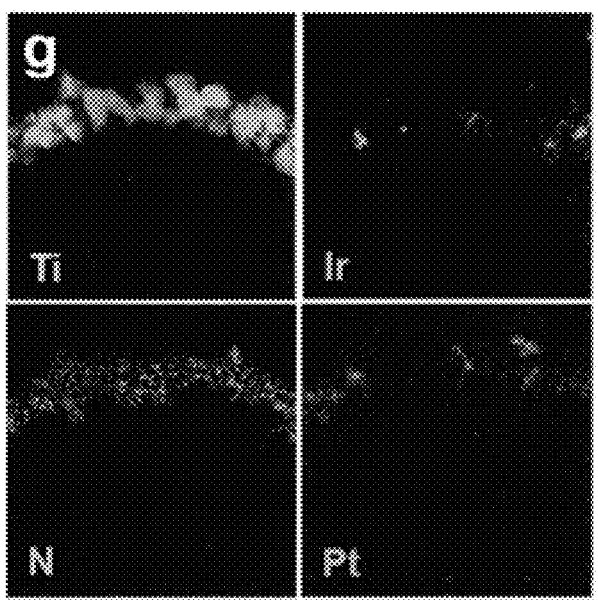
FIG. 2G shows ELLS mapping of Ti, Ir, N, and Pt signals in the cross-sectional structure of the photocatalyst of Example 1 treated with TXP and PIP.

FIG. 2E shows the cross-sectional structure of the photocatalyst of Example 1 treated with TXP and PIP. FIG. 2F shows an enlarged TEM image of the square part of FIG. 2E, and the figure inserted in FIG. 2F shows the overlay of ELLS elemental mapping. FIG. 2G shows ELLS mapping of Ti, Ir, N, and Pt signals in the cross-sectional structure of the photocatalyst of Example 1 treated with TXP and PIP.

According to FIGS. 2E, 2F, and 2G, it can be confirmed that the photocatalyst for water-splitting hydrogen production prepared according to Example 1 forms a heterojunction and is spatially separated from cocatalysts Pt and $IrO_x$. In detail, it can be confirmed that Ti represents the skeleton of a hollow sphere, and N is lightly coated on the outer surface of Ti to form a heterojunction. In addition, it can be confirmed that Ir and Pt are spatially separated by being attached to opposite sides of each other.

Experimental Example 2: Confirmation of Optical Properties According to Heterojunction of $TiO_2$ and g-$C_3N_4$ FIG. 4A shows the UV-visible diffuse reflectance spectra (UV-visible DRS) results of the $TiO_2$ hollow sphere and g-$C_3N_4$, which are the materials of Example 1, and CT (g-$C_3N_4$/$TiO_2$) heterojunction of the two materials.

Figure 4A:
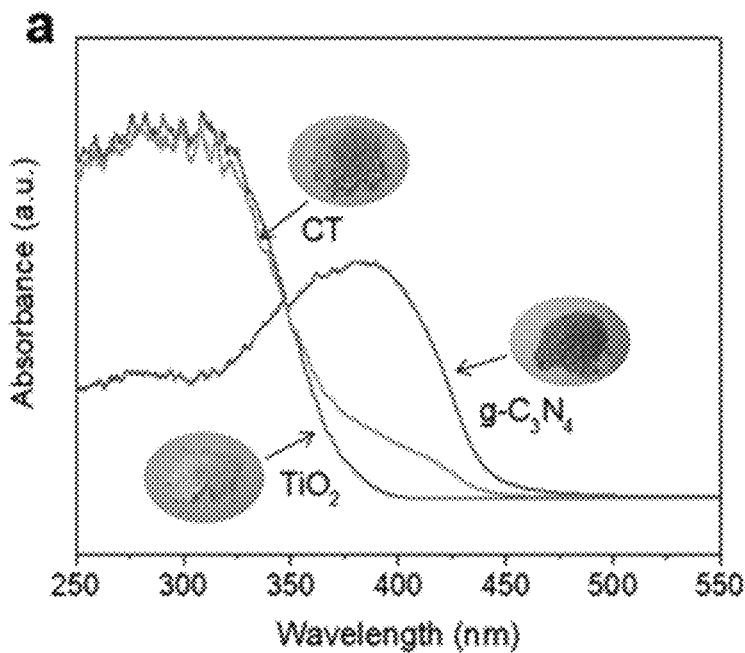
FIG. 4A shows the UV-visible diffuse reflectance spectra (UV-visible DRS) results of the $TiO_2$ hollow sphere and $g-C_3N_4$, which are the materials of Example 1, and CT ($g-C_3N_4/TiO_2$) heterojunction of the two materials.

According to FIG. 4A, the $TiO_2$ hollow sphere showed strong absorption only in the UV region, whereas g-$C_3N_4$ exhibited moderate absorption in the visible region of up to about 450 nm. Compared to $TiO_2$, CT shows a light-yellow color change as $TiO_2$ and g-$C_3N_4$ heterojunction is formed, and it can be confirmed that a redshift occurs in the visible light region. In addition, it can be confirmed that the light absorption step of CT is two steps, which correspond to the intrinsic absorption of $TiO_2$ and g-$C_3N_4$, respectively.

Figure 4B:
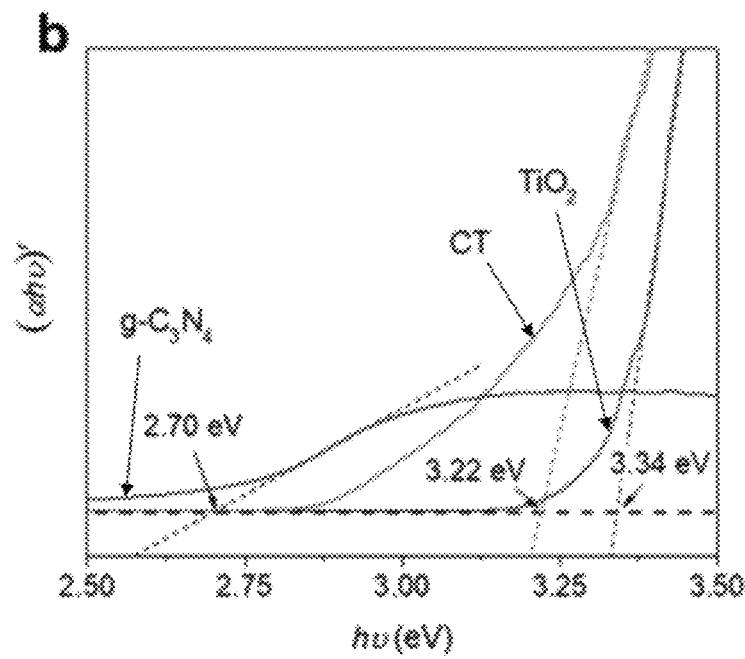
FIG. 4B shows the corresponding Tauc plots of $TiO_2$ and $g-C_3N_4$, which are materials of Example 1, and the CT ($g-C_3N_4/TiO_2$) heterojunction of the two materials using $(\alpha h\upsilon)^r$ as a function of photon energy.

FIG. 4B shows the corresponding Tauc plots of $TiO_2$ and g-$C_3N_4$, which are materials of Example 1, and the CT (g-$C_3N_4$/$TiO_2$) heterojunction of the two materials using $(\alpha h\nu)^r$ as a function of photon energy. Specifically, $\alpha$ is the absorption coefficient, h is Planck's constant, $\nu$ is the light frequency, r=2 for $TiO_2$, and r=0.5 for g-$C_3N_4$. According to the above formula, the intrinsic band gap of $TiO_2$ hollow sphere and g-$C_3N_4$ was calculated.

According to FIG. 4B, the intrinsic band gap of the $TiO_2$ hollow sphere were calculated to be 3.34 eV, the intrinsic band gap of g-$C_3N_4$ was calculated to be 2.70 eV, and the CT was calculated to be 3.22 eV.

Figure 4C:
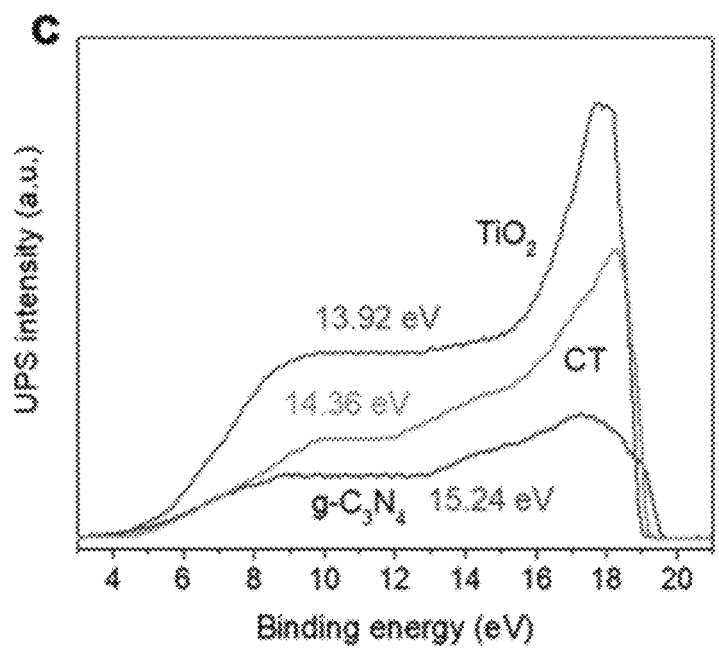
FIG. 4C shows the UV photoelectron spectroscopy results of the $TiO_2$ hollow sphere and $g-C_3N_4$, which are the materials of Example 1, and CT ($g-C_3N_4/TiO_2$) heterojunction of the two materials.

FIG. 4C shows the UV photoelectron spectroscopy results of $TiO_2$ hollow sphere and g-$C_3N_4$, which are the materials of Example 1, and CT (g-$C_3N_4$/$TiO_2$) heterojunction of the two materials.

According to FIG. 4C, the ionization potentials of $TiO_2$ and g-$C_3N_4$ corresponding to the valence band (VB) energy was calculated as −7.3 and −5.98 eV (vs. vacuum), respectively, by subtracting the peak width from the excitation energy (21.22 eV). Then, the VB energy of $TiO_2$ and g-$C_3N_4$ versus the reversible hydrogen electrode (RHE) is were converted to 2.68 and 1.54 eV, respectively, using the $E_{vacuum}=-E_{RHE}-4.44$ eV equation.

Figure 3C:
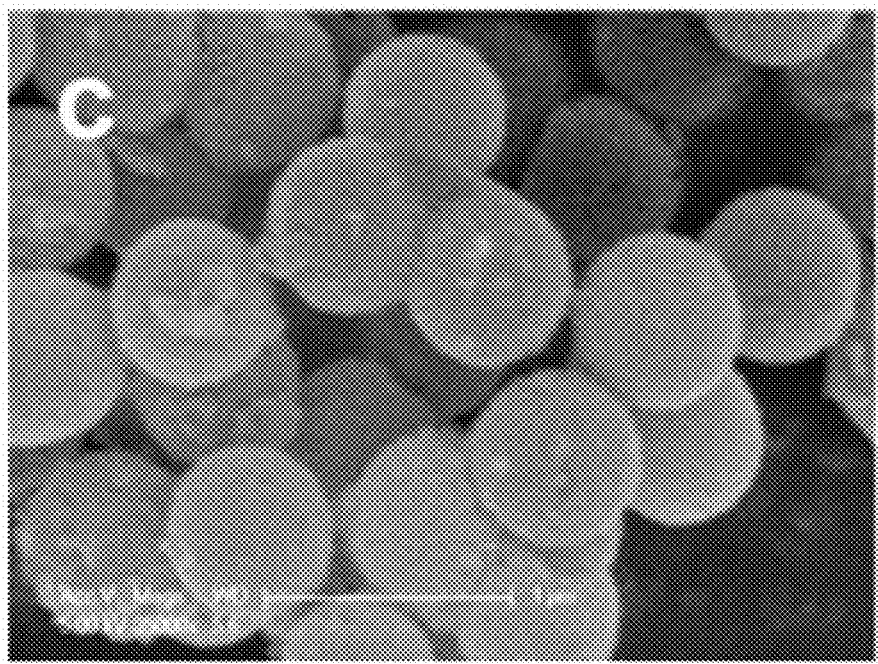
FIG. 3C is a TEM image of $gC_3N_4/TiO_2/IrO_x/SiO_2$ prepared in the process of preparing a photocatalyst according to Example 1.
Figure 3D:
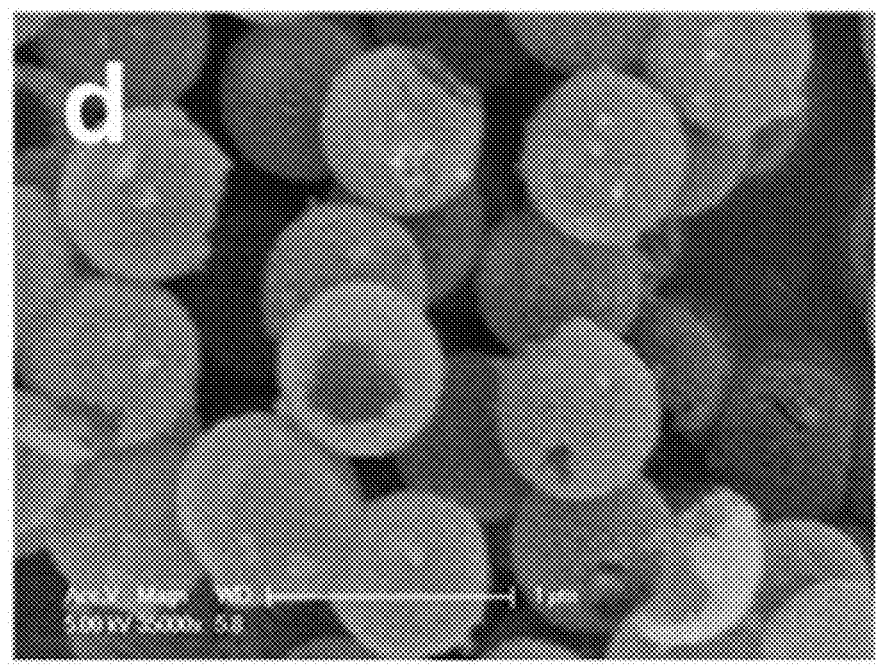
FIG. 3D is a TEM image of a $Pt/g-C_3N_4/TiO_2/IrO_x$/core (void) photocatalyst prepared according to Example 1.
Figure 4D:
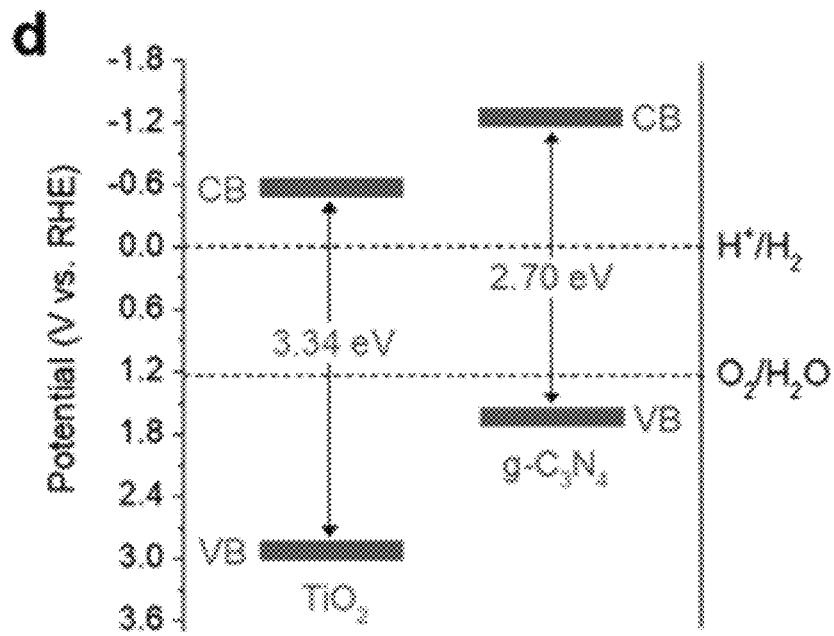
FIG. 4D shows the aligned band structures of $TiO_2$ hollow sphere and $g-C_3N_4$, which are the materials of Example 1.

FIG. 4D shows the aligned band structures of the $TiO_2$ hollow sphere and g-$C_3N_4$, which are the materials of Example 1. In detail, FIG. 3D is prepared using the bandgap value calculated in FIG. 3B and the VB energy measured in FIG. 3C.

According to FIG. 4D, the conduction band (CB) of g-$C_3N_4$ is sufficiently negative for efficient $H_2$ generation, indicating that the heterojunction of g-$C_3N_4$ and $TiO_2$ is an appropriate photocatalyst with a strong reduction ability of CB electrons, so it can be confirmed that the heterojunction of g-$C_3N_4$ and $TiO_2$ is suitable for proton reduction.

Figure 5A:
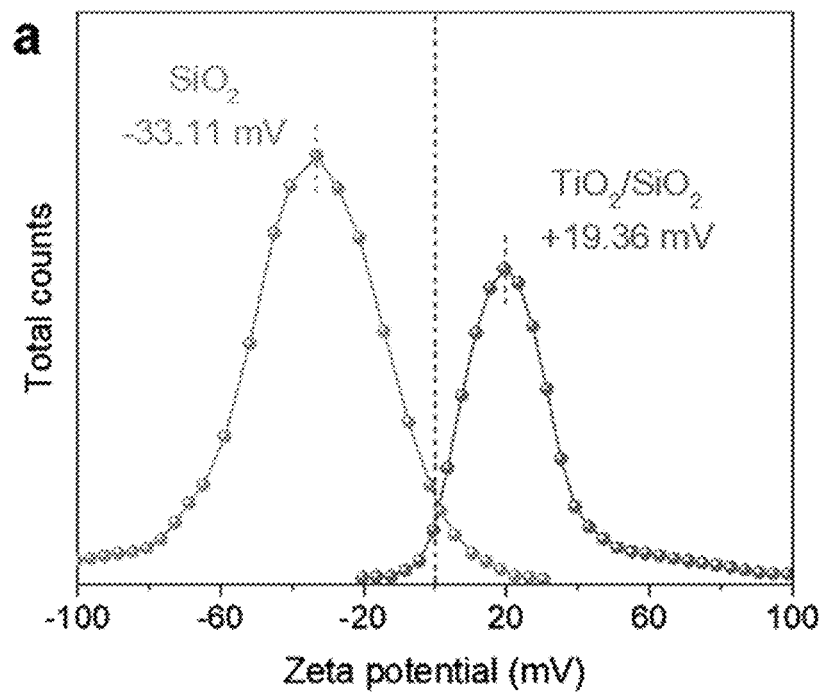
FIG. 5A shows the zeta potential of $SiO_2$ and $TiO_2/SiO_2$, which are the materials of Example 1.

Experimental Example 3: Confirmation of the Z-Scheme Charge Transfer Pathway According to the Heterojunction of $TiO_2$ and g-$C_3N_4$ FIG. 5A shows the zeta potential of $SiO_2$ and $TiO_2$/$SiO_2$, which are the materials of Example 1. In detail, the Zeta potential of $SiO_2$ represents the case of pH 9, and the Zeta potential of the $TiO_2$/$SiO_2$ represents the case of pH 4.

According to FIG. 5A, it can be confirmed that the zeta potential of the pristine $SiO_2$ nanospheres was measured as −33.11 mV in the ethanol solution to which $NH_4OH$ was added. Therefore, $Ti^{4+}$ ions can be easily adsorbed on negatively charged sites on the $SiO_2$ surface through electrostatic interactions. Then, due to the rich —C—N— motif, cyanamide, a precursor of negatively charged g-$C_3N_4$, can be easily adsorbed onto the positively charged $TiO_2$ surface (+19.36 mV). Therefore, during subsequent annealing, ultrathin g-$C_3N_4$ was synthesized and strongly anchored to the $TiO_2$ surface, resulting in a CT heterostructure with intimate contact between components.

Figure 5B:
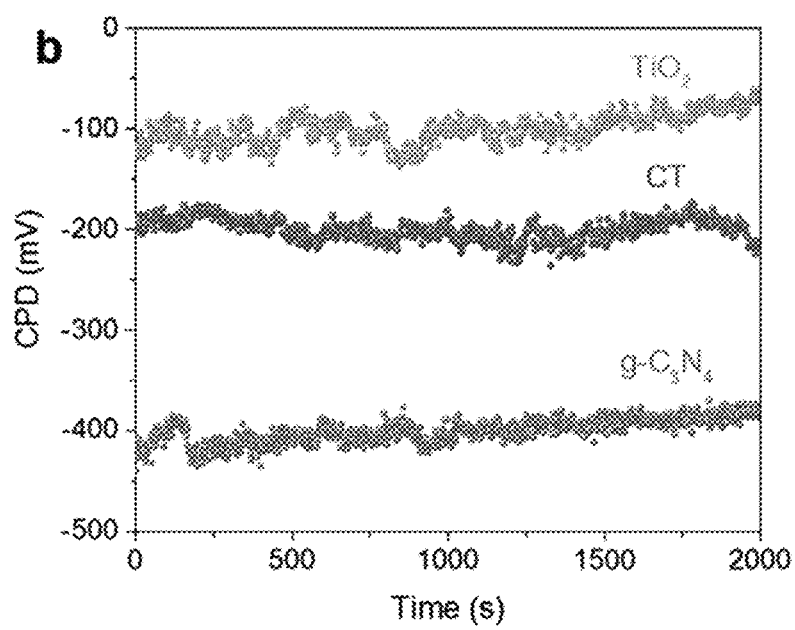
FIG. 5B shows the contact potential difference (CPD) measurement results with a Pt probe in the dark of $TiO_2$ hollow sphere and $g-C_3N_4$, which are the materials of Example 1, and CT ($g-C_3N_4/TiO_2$) heterojunction of the two materials.

FIG. 5B shows the contact potential difference (CPD) measurement results with a Pt probe in the dark of $TiO_2$ hollow sphere and g-$C_3N_4$, which are the materials of Example 1, and CT (g-$C_3N_4$/$TiO_2$) heterojunction of the two materials. Specifically, in order to further confirm the electron transfer between g-$C_3N_4$ and $TiO_2$, their work function (WF) was measured using a Kelvin probe.

According to FIG. 5B, it can be confirmed that the CPD between the g-$C_3N_4$ and the Pt probe is −400 mV, whereas the CPD between the $TiO_2$ and the Pt probe is −100 mV. Using Formula 1 below, the work functions (WF) of g-$C_3N_4$ and $TiO_2$ were calculated to be 4.38 eV and 4.68 eV, respectively.

WF(eV)=WF of the Pt probe+e×CPD [Formula 1]

In Formula 1,

The WF of the Pt probe is 4.78 eV, e is the charge of the electron.

Figure 5C:
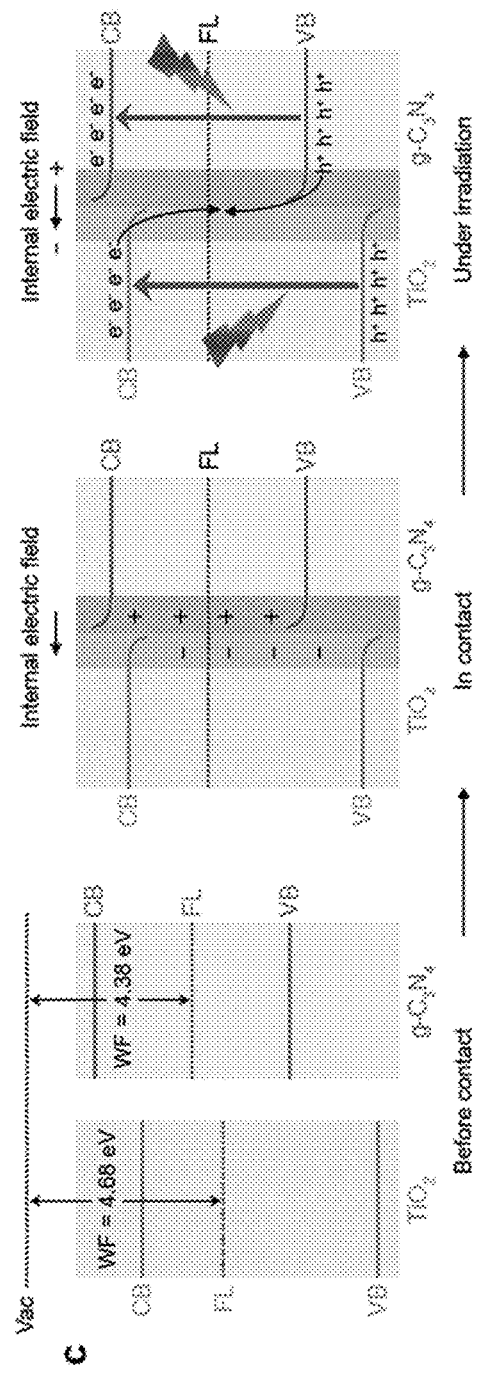
FIG. 5C shows a schematic diagram of the Z-scheme charge transfer process of the $TiO_2/g-C_3N_4$ heterojunction in Example 1.

FIG. 5C shows a schematic diagram of the Z-scheme charge transfer process of the $TiO_2$/g-$C_3N_4$ heterojunction in Example 1. In detail, based on the fact that the work functions (WF) of g-$C_3N_4$ and $TiO_2$ are 4.38 eV and 4.68 eV, respectively, and FIG. 4B shows a schematic diagram of the Z-scheme charge transfer process of the $TiO_2$/g-$C_3N_4$ heterojunction.

According to FIG. 5C, when g-$C_3N_4$ and $TiO_2$ were in contact, free electrons moved from g-$C_3N_4$ to $TiO_2$ through the intimate interface until the Fermi level reached equilibrium. At equilibrium, electrons accumulated at the $TiO_2$ interface while the electron density decreased at the $g-C_3N_4$ interface. As a result, positively charged $g-C_3N_4$ and negatively charged $TiO_2$ generated an internal electric field directed from $g-C_3N_4$ to $TiO_2$ at the interface. As the electrons of $g-C_3N_4$ are repelled by the internal electric field, the potential energy increases, and the band is bent upward, whereas in $TiO_2$, the potential energy of electrons decreases and the band is bent downward. When irradiated with light, photogenerated electrons in the conduction band of $TiO_2$ have the potential to recombine with photogenerated holes in the valence band of $g-C_3N_4$ through the interface driven by the internal electric field and interfacial band bending, which means the Z-scheme charge transfer process in the CT heterostructure hollow sphere.

Electron spin resonance (ESR) analysis was performed for direct evidence of Z-scheme charge transfer within the CT hollow sphere. The ESR analysis uses 5,5-dimethyl-1-pyrroline N-oxide (DMSO) as a trapping agent to detect superoxide and hydroxyl radicals ($\cdot O_2^-$ and $\cdot OH$).

Figure 6A:
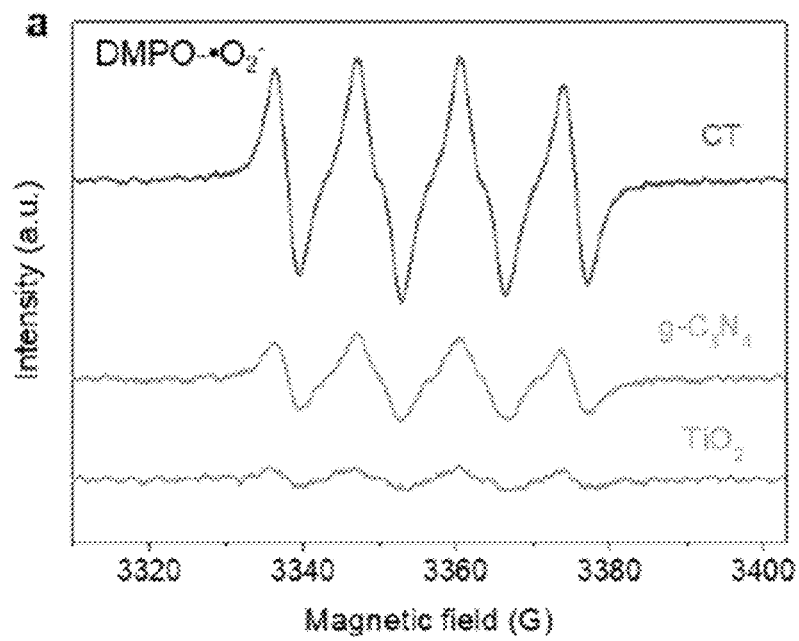
FIG. 6A shows the ESR signals of DMPO-·$O_2$— adducts in methanol for the prepared photocatalysts ($TiO_2$, $g-C_3N_4$, and CT) under illumination for 120 seconds.
Figure 6B:
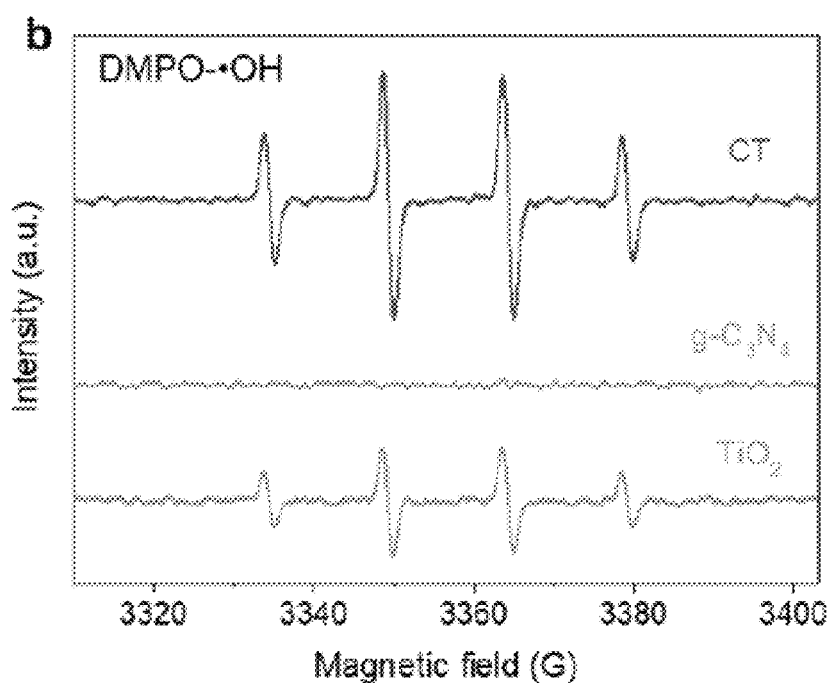
FIG. 6B shows the ESR signals of DMPO-·OH adducts in DI water for the prepared photocatalysts ($TiO_2$, $g-C_3N_4$, and CT) under illumination for 120 seconds.

FIG. 6A shows ESR signals of DMPO-$\cdot O_2^-$ adducts in methanol for prepared photocatalysts ($TiO_2$, $g-C_3N_4$, and CT) under illumination for 120 seconds. FIG. 6B shows the ESR signals of DMPO-$\cdot OH$ adducts in DI water for photocatalysts ($TiO_2$, $g-C_3N_4$, and CT) prepared under illumination for 120 seconds. Specifically, methanol/DMPO/photocatalyst ($\cdot O_2^-$) and DI water/DMPO/photocatalyst ($\cdot OH$) mixtures were measured for 120 seconds and ESR signals were measured and shown in FIGS. 5A and 5B, respectively.

According to FIG. 6A, in the case of DMPO-$\cdot O_2^-$, since the potential of $O_2/\cdot O_2^-$ is $-0.33$ V compared to RHE at pH 7, $TiO_2$ (CB=$-0.48$ eV) showed a weak ESR signal, whereas $g-C_3N_4$ (CB=$-1.16$ eV) showed a stronger ESR signal showing the reduction potential difference between $TiO_2$ and $g-C_3N_4$. In comparison, the CT heterojunction had the most enhanced ESR signal, which may be due to the improved reduction ability due to the improved charge separation efficiency.

According to FIG. 6B, in the case of DMPO-$\cdot OH$, two oxidation reactions of $\cdot OH/OH-$ and $\cdot OH/H_2O$ were considered, which occur at 1.99 and 2.34 V versus RHE at pH 7, respectively. $TiO_2$ with a relatively positive VB (2.86 eV) than the potential of $\cdot OH/OH-$ and $\cdot OH/H_2O$ exhibits an ESR signal, whereas $g-C_3N_4$ with a relatively negative VB (1.54 eV) than the potential of $\cdot OH/OH-$ and $\cdot OH/H_2O$, showed a negligible ERS signal.

Figure 6C:
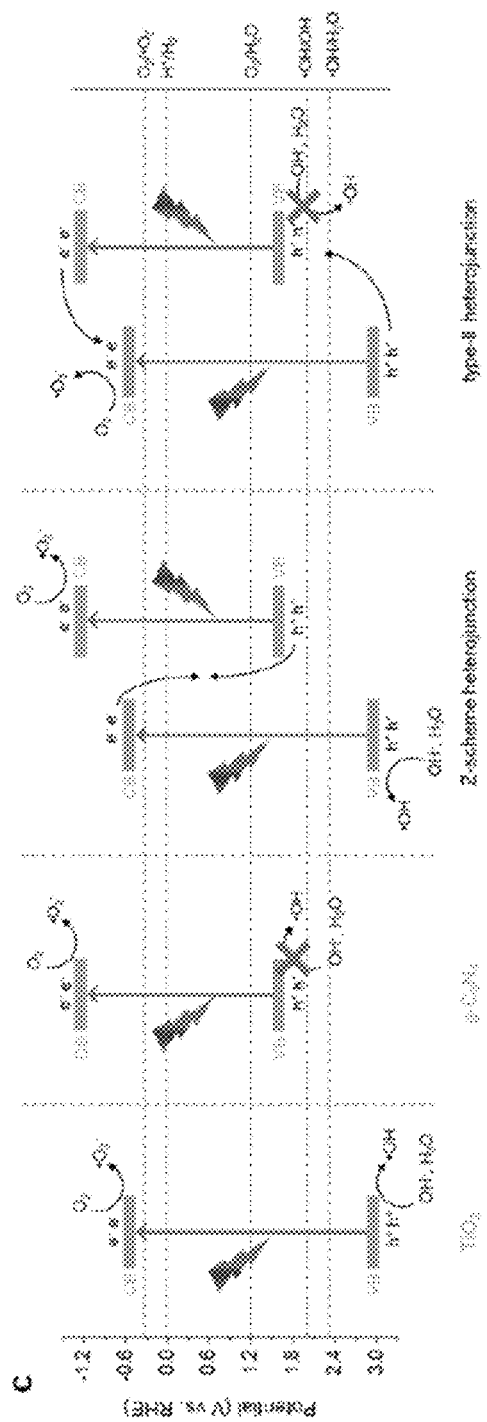
FIG. 6C shows a schematic diagram of the charge transfer process in $TiO_2$, $g-C_3N_4$, and Z-scheme heterojunction and type II heterojunction of the two materials.

FIG. 6C shows a schematic diagram of the charge transfer process in $TiO_2$, $g-C_3N_4$, Z-scheme heterojunction, and type II hetero junction.

According to FIGS. 6A to 6C, when the heterojunction between $TiO_2$ and $g-C_3N_4$ is type-II, since no hydroxyl radical is generated, it can be confirmed that the CT heterojunction is a Z-scheme heterojunction.

Experimental Example 4: Confirmation of the Effect of Spatially Separating Cocatalysts A photocatalytic hydrogen generation reaction using the photocatalysts prepared according to Example 1 and Comparative Examples 1 to 11 was performed in a 30 mL sealed Pyrex reactor. A measured amount of the catalysts prepared according to Example 1 and Comparative Examples 1 to 11 was added to the sacrificial reagent (10 vol % MeOH for $H_2$ generation and 0.01 mol/L $AgNO_3$ for $O_2$ generation) and dispersed in water using a magnetic stirrer at a constant rotation speed. Ar was purged through the reactor for 1 hour prior to the reaction to remove residual air. Then, a 300 W Xe lamp (Oriel 66902-500 F/1, Newport Corp., USA) was used as a light source to trigger the photocatalytic generation of $H_2$ and $O_2$.

Figure 7B:
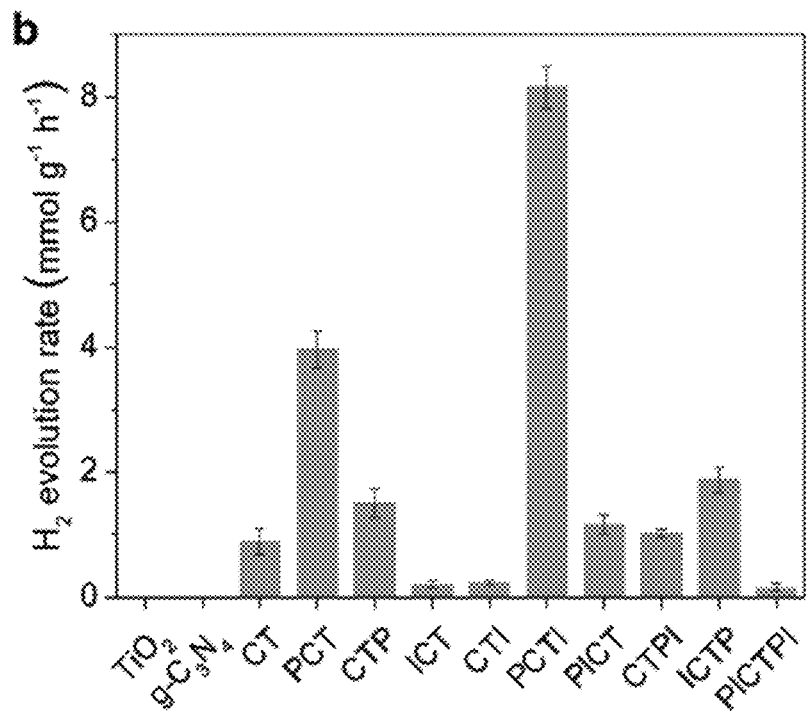
FIG. 7B shows a comparison of $H_2$ generation rates under full spectrum irradiation (20 mL of 10 vol % aqueous MeOH) of $TiO_2$ hollow sphere, bulk $g-C_3N_4$, and catalysts prepared according to Example 1 and Comparative Examples 1 to 11.

FIG. 7B shows a comparison of $H_2$ generation rates under full spectrum irradiation (20 mL of 10 vol % aqueous MeOH) of $TiO_2$ hollow sphere, bulk $g-C_3N_4$, and catalysts prepared according to Example 1 and Comparative Examples 1 to 11.

According to FIG. 7B, it can be confirmed that both the $TiO_2$ hollow sphere and bulk $g-C_3N_4$ do not generate hydrogen because proton reduction is impossible, but the heterojunction CT splits water to generate $H_2$ even without a cocatalyst due to the interfacial Z-scheme charge transfer. Meanwhile, in Comparative Example 4 (ICT) and Comparative Example 5 (CTI) in which $IrO_x$ was loaded on the CT heterostructure hollow sphere, it can be confirmed that a small amount of $H_2$ was generated due to the low hydrogen generation activity of $IrO_x$. Interestingly, Comparative Example 2 (PCT) and Comparative Example 3 (CTP), which are CT hollow spheres equipped with only Pt, showed higher $H_2$ generation performance than Comparative Examples 6 (PICT), Comparative Examples 7 (CTPI), and Comparative Examples 9 (PICTPIP), which are samples equipped with $IrO_x$ and Pt dual promoters, which means that the random distribution of the catalyst induces more charge recombination. As a result, it can be seen that Comparative Example 9 (PICTPI), in which dual cocatalysts ($IrO_x$ and Pt are present in the same layer) are randomly loaded on both sides, has the lowest $H_2$-generating activity among the prepared photocatalysts.

Furthermore, it is confirmed that Example 1 (PCTI), Comparative Example 2 (PCT), and Comparative Example 6 (PICT), in which Pt are loaded on the $g-C_3N_4$ side, have a relatively higher $H_2$-generation activity than Comparative Example 8 (ICTP), Comparative Example 3 (CTP), and Comparative Example 7 (CTPI), in which Pt are loaded oppositely on the $TiO_2$ side, which indicates that the loading position of the cocatalyst along the Z-scheme charge transfer path is important for photocatalytic activity.

On the other hand, it can be confirmed that Example 1 (PCTI), in which Pt and $IrO_x$ were separately loaded into $g-C_3N_4$ and $TiO_2$, respectively, had the highest $H_2$ generation performance of 8.15 mmol h-1 g-1 due to the cooperation of the spatially separated cocatalyst with the Z-scheme hetero structure.

Figure 7C:
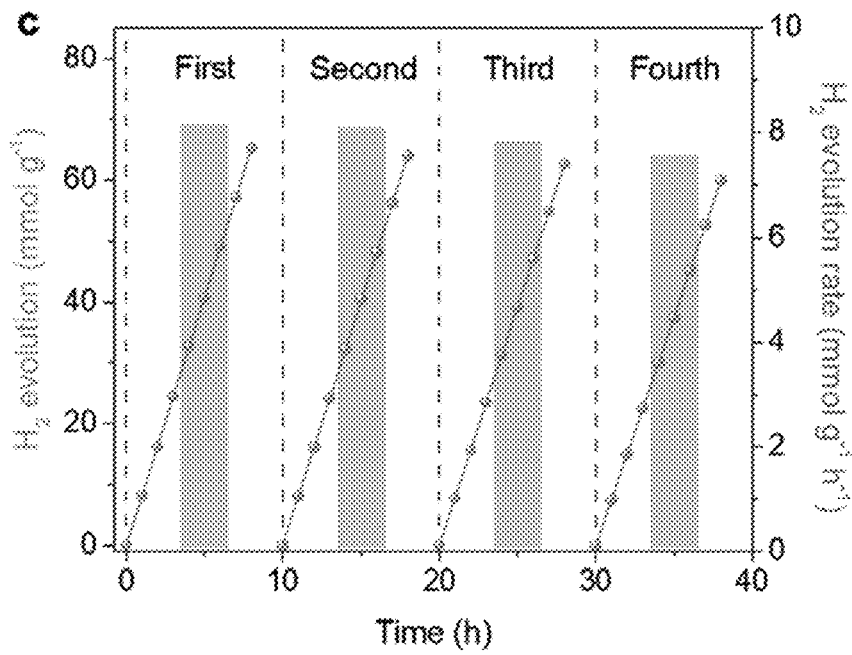
FIG. 7C shows the $H_2$ generation rate according to the $H_2$ generation cycle of the photocatalyst of Example 1, and each cycle proceeded after flushing Ar for 1 hour.

FIG. 7C shows the $H_2$ generation rate according to the $H_2$ generation cycle of the photocatalyst of Example 1, and each cycle proceeded after flushing Ar for 1 hour.

According to FIG. 7C, it can be seen that the photocatalytic activity of Example 1 does not decrease during the 4 reaction cycles (8 hours per cycle), and the last cycle maintains ≈92% of the $H_2$ generation rate of the first cycle. This means that the PCTI heterostructure hollow sphere of Example 1 is very stable against proton reduction.

Figure 7D:
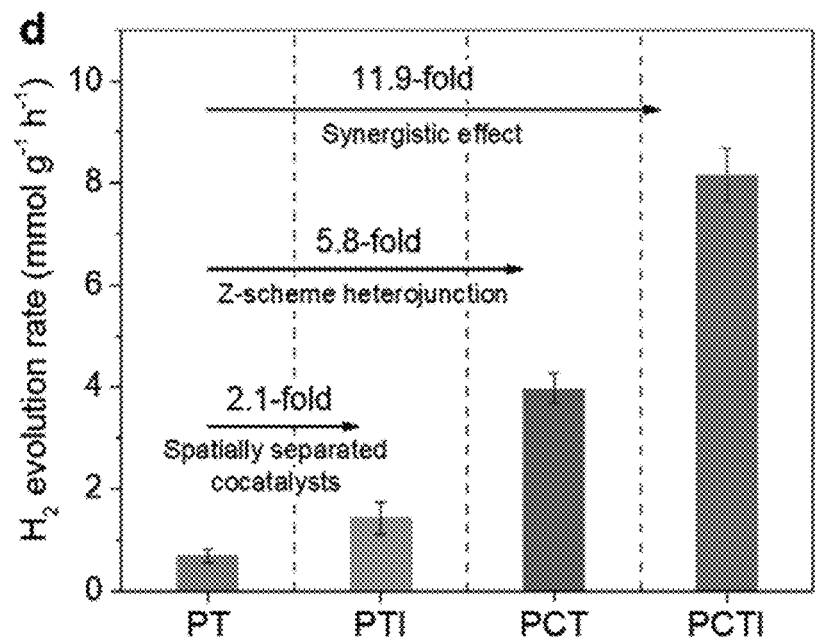
FIG. 7D shows a comparison of $H_2$ generation rates of Example 1 (PCTI), Comparative Example 2 (PCT), Comparative Example 10 (PT), and Comparative Example 11 (PTI)

FIG. 7D shows a comparison of $H_2$ generation rates of Example 1 (PCTI), Comparative Example 2 (PCT), Comparative Example 10 (PT), and Comparative Example 11 (PTI). Comparison of Example 1 (PCTI), Comparative Example 2 (PCT), Comparative Example 10 (PT), and Comparative Example 11 (PTI) is to carefully investigate the synergistic effect of the Z-scheme heterojunction and the spatially separated cocatalyst.

According to FIG. 7D, the $TiO_2$ hollow sphere loaded with Pt (Comparative Example 10, PT) showed an $H_2$ generation rate of mmol g-1 h-1. In comparison, Comparative Example 11 (PTI) showed a 2.1 times increased $H_2$ generation rate (1.43 mmol g−1 h−1) due to the spatially separated cocatalyst, whereas Comparative Example 2 (PCT) showed an $H_2$ generation rate (3.97 mmol g−1 h−1) increased by 5.8 times due to Z-scheme charge transfer between $g-C_3N_4$ and $TiO_2$. In contrast, it can be seen that the $H_2$ generation rate of Example 1 (PCTI) increased 11.9 times compared to Comparative Example 10 (PT). This increase in $H_2$ generation rate does not increase individually by simply adding a spatially separated cocatalyst to the Z-scheme heterojunction but means that there is a synergistic effect of the two methods (Z-scheme heterojunction and spatially separated cocatalyst).

Figure 7E:
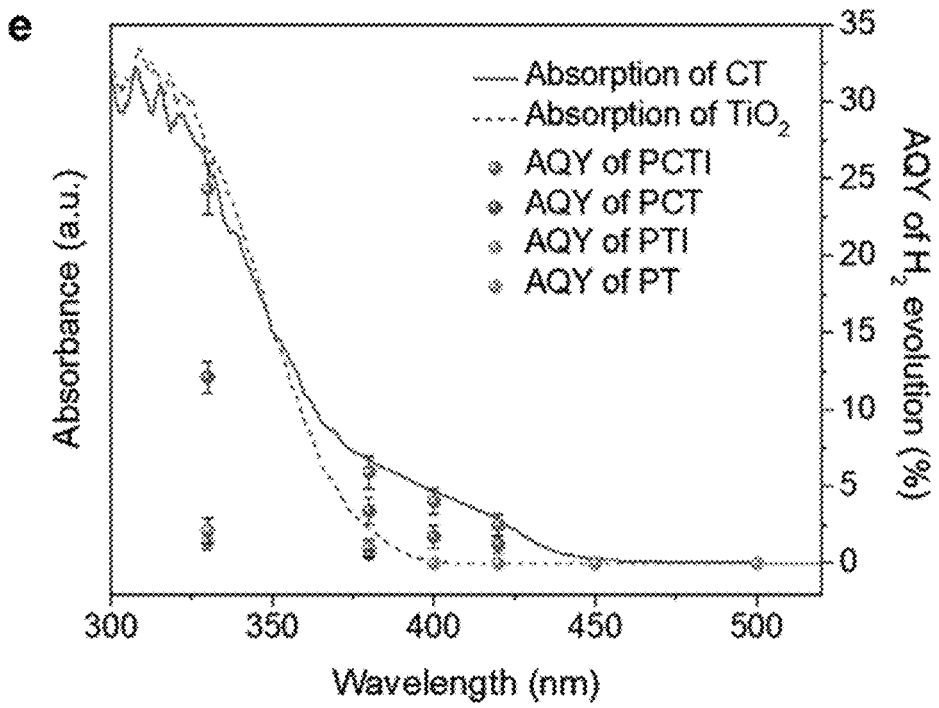
FIG. 7E shows the wavelength-dependent apparent quantum yield (AQY) of photocatalyst $H_2$ generation and light absorption spectra of Example 1 (PCTI), Comparative Example 2 (PCT), Comparative Example 10 (PT), and Comparative Example 11 (PTI)

FIG. 7E shows the wavelength-dependent apparent quantum yield (AQY) of photocatalyst $H_2$ generation and light absorption spectra of Example 1 (PCTI), Comparative Example 2 (PCT), Comparative Example 10 (PT), and Comparative Example 11 (PTI).

The AQY for the photocatalyst $H_2$ generation was measured under the illumination of a 300 W Xe lamp (Oriel 66902-500 F/1, Newport Corp., USA) using other bandpass filters ($\lambda$=330±5, 380±5, 400±5, 420±5, 450±5, and 500±10). The number of particle photons was determined using an optical power meter (1919-R, Newport Corp.).

For a single-component photocatalytic system, the AQY value was calculated according to Formula (2) along the one-stage excitation process, and for a double-photon Z-scheme photocatalytic system, the AQY value was calculated according to Formula (3).

$$AQY(\%) = \frac{\text{Number of reacted electrons}}{\text{Number of incident photons}} \times 100\%$$
$$= \frac{\text{Number of evolved } H_2 \text{ molecules} \times 2}{\text{Number of } incidnet \text{ photons}} \times 100\% \quad (2)$$
$$= \frac{\text{Number of evolved } H_2 \text{ molecules} \times 4}{\text{Number of } incidnet \text{ photons}} \times 100\% \quad (3)$$

According to FIG. 7E, the coherence between light absorption and AQY at different wavelengths suggests that the water-splitting reaction was actually driven by light absorption by the photocatalyst. In addition, due to the negligible visible light absorption of $TiO_2$, the AQY values were compared at 330 nm, and the calculated AQY values of Example 1 (PCTI), Comparative Example 2 (PCT), Comparative Example 10 (PT), and Comparative Example 11 (PTI) were 24.3%, 12.1%, 1.03%, and 2.14%, respectively. In the case of Comparative Example 10 (PT) and Comparative Example 11 (PTI), the above Formula (2) (formula for the one-step excitation process) was used, and Example 1 (PCTI) and Comparative Example 2 (PCT) the above Formula (3) (formula for the two-step excitation process) was used.

At 330 nm, it can be seen that Comparative Example 11 (PTI) and Comparative Example 2 (PCT) are about 1.9 times and about 11.7 times improved compared to the AQY of Comparative Example 10 (PT), and Example 1 (PCTI) was improved by about 24 times compared to the AQY of Comparative Example 10 (PT) due to the synergy effect of the cocatalyst spatially separated from the Z-scheme heterojunction.

Meanwhile, on the other hand, the AQY of Example 1 (PCTI) is calculated to be 2.49% at 420 nm, which is not as good as the AQY of Example 1 (PCTI) at 330 nm. This may be due to poor photon harvesting of $TiO_2$ in visible light irradiation resulting in incorrect Z-scheme charge shifts within the PCTI system.

Figure 7F:
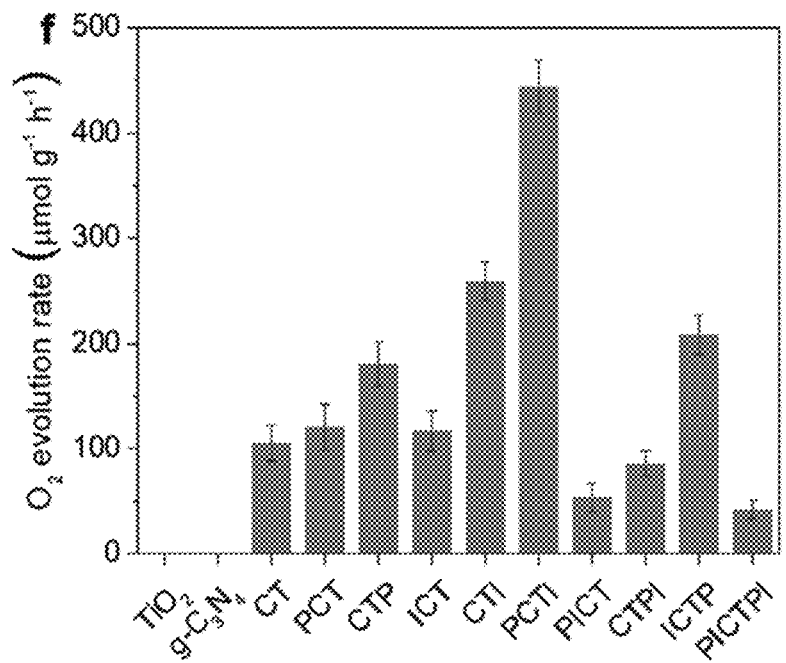
FIG. 7F shows a comparison of $O_2$ generation rates under full spectrum irradiation (20 mL of 0.01 M $AgNO_3$ aqueous solution) of $TiO_2$ hollow sphere, bulk $g-C_3N_4$, and catalysts prepared according to Example 1 and Comparative Examples 1 to 11.

FIG. 7F shows a comparison of $O_2$ generation rates under full spectrum irradiation (20 mL of 0.01 M $AgNO_3$ aqueous solution) of $TiO_2$ hollow sphere, bulk $g-C_3N_4$, and catalysts prepared according to Example 1 and Comparative Examples 1 to 11.

According to FIG. 7F, similar to $H_2$ generation, Example 1 (PCTI) showed the highest $O_2$ generation rate (443.9 µmol g−1 h−1) compared to other samples, indicating that the synergy effect between Z-scheme charge transfer and spatially separated cocatalyst is effective for $O_2$ generation. In addition, samples loaded with $IrO_x$ in $TiO_2$ (Comparative Example 5 (CTI) and Example 1 (PCTI)) induced higher $O_2$ generation performance than other samples, proving the importance of the cocatalyst loading position once again.

Figure 7G:
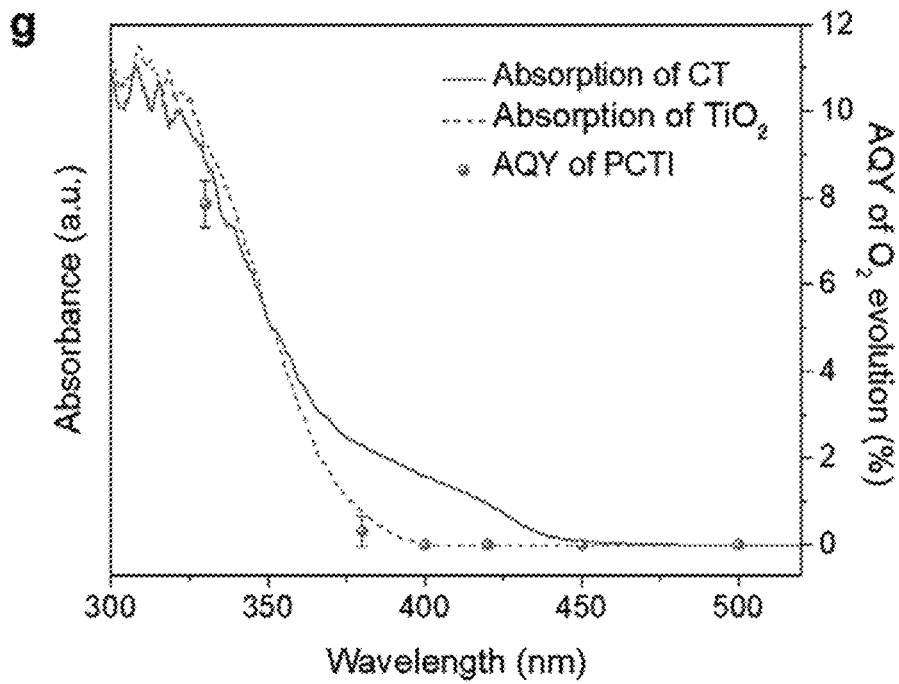
FIG. 7G shows the wavelength-dependent apparent quantum yield (AQY) of the photocatalyst $O_2$ generation and light absorption spectrum of Example 1 (PCTI)

FIG. 7G shows the wavelength-dependent apparent quantum yield (AQY) of the photocatalyst $O_2$ generation and light absorption spectrum of Example 1 (PCTI).

AQY for $O_2$ generation from the photocatalyst was measured under the same conditions as when AQY for $H_2$ generation from the photocatalyst was measured. However, the AQY value was calculated using Formula (4) below for the dual photon Z-scheme photocatalyst system in teams of the Z-scheme reaction pathway.

$$AQY(\%) = \frac{\text{Number of reacted electrons}}{\text{Number of incident photons}} \times 100\%$$
$$= \frac{\text{Number of evolved } O_2 \text{ molecules} \times 8}{\text{Number of } incidnet \text{ photons}} \times 100\% \quad (4)$$

According to FIG. 7G, the AQY profile of $O_2$ generation is more consistent with the optical absorption of $TiO_2$ than with CT heterogeneous bonding, indicating that the $O_2$ generation reaction was induced by the hole of $TiO_2$ as a result of the Z-scheme. At 330 nm, AQY was calculated to be 7.89% using Formula (4) above, which is a formula for a dual-photon Z-scheme photocatalytic system.

Experimental Example 5: Check Charge Transfer Efficiency

Figure 8A:
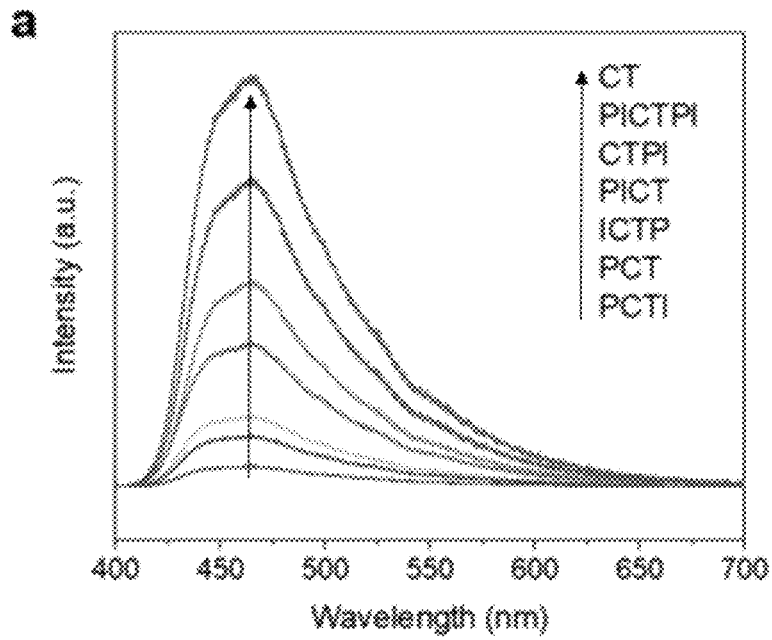
FIG. 8A shows steady-state photoluminescence (PL) emission spectra of Example 1 and Comparative Examples 1, 2, and 6 to 9.

FIG. 8A shows steady-state photoluminescence (PL) emission spectra of Example 1 and Comparative Examples 1, 2, and 6 to 9.

According to FIG. 8A, the CT (Comparative Example 1) without the cocatalyst showed a prominent PL emission band centered at 470 nm, and it can be seen that the PL intensity of the CT significantly decreased when the cocatalyst was loaded. This indicates that the local charge carriers of CT can be further transported to the loaded cocatalyst. Among the six samples loaded with cocatalyst (PICTPI, CTPI, PICT, ICTP, PCTI), Example 1 (PCTI) showed the most dramatic PL quenching showing the most effective charge separation. This means that loading double cocatalysts, i.e., Pt in $g-C_3N_4$ and $IrO_x$ in $TiO_2$, on a specific surface of the CT can suppress the radiative recombination of charge carriers the most and cause the most significant charge carrier separation.

Figure 8B:
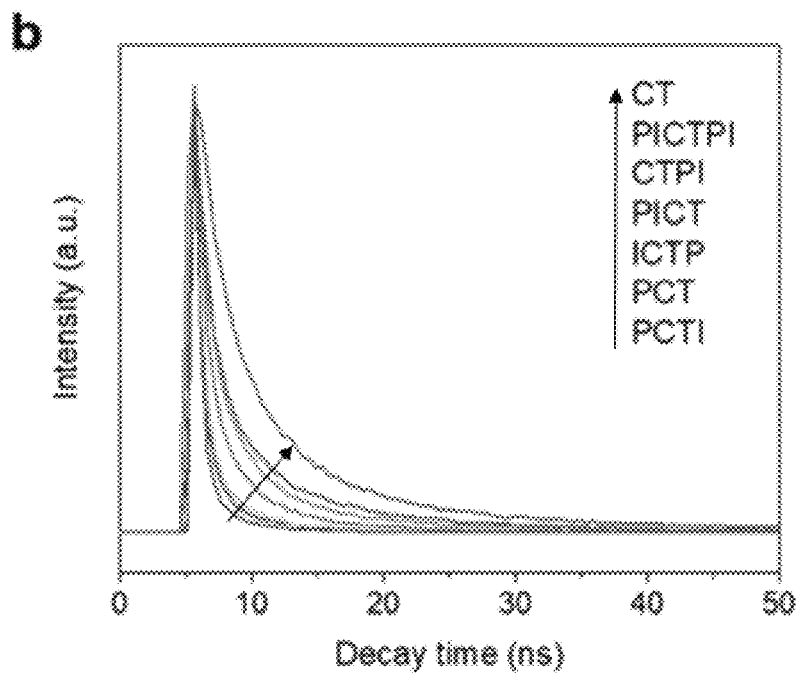
FIG. 8B shows time-resolved PL (TRPL) spectra of Example 1 and Comparative Examples 1, 2, and 6 to 9.

FIG. 8B shows the time-resolved PL (TRPL) spectra of Example 1 and Comparative Examples 1, 2, and 6 to 9.

According to FIG. 8B, the CT without a cocatalyst (Comparative Example 1) shows the shortest lifetime of the photoexcited charge carriers, and it can be seen that the lifetime of the charge carriers of the CT is improved when the cocatalyst is loaded. This indicates that the local charge carriers of CT can be further transported to the loaded cocatalyst. Among the six samples loaded with cocatalyst (PICTPI, CTPI, PICT, ICTP, PCTI), Example 1 (PCTI) exhibited the longest charge carrier lifetime. This means that loading double cocatalysts, i.e., Pt in g-$C_3N_4$ and $IrO_x$ in $TiO_2$, on a specific surface of the CT can suppress the radiative recombination of charge carriers the most and thus have the most remarkable charge carrier transfer efficiency.

Figure 8C:
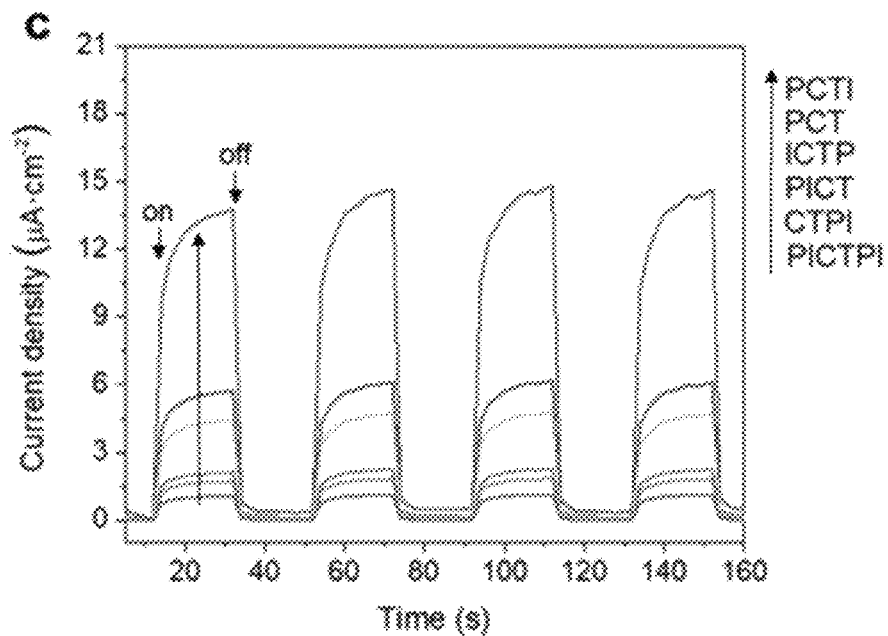
FIG. 8C shows photoelectric responses according to on/off lighting cycles of Example 1 and Comparative Examples 2 and 6 to 9.

FIG. 8C shows photoelectric responses according to on/off lighting cycles of Example 1 and Comparative Examples 2 and 6 to 9. Specifically, the transient photocurrent density curve of photocatalysts prepared at 0.0 V vs. Ag/AgCl in 0.5 m $Na_2SO_4$ solution under sequential lighting conditions when on/off switches are operated every 20 seconds.

According to FIG. 8C, it can be seen that the transient photocurrent density of Example 1 (PCTI) is much higher than that of the other cocatalyst-equipped samples (PCT, ICTP, PICT, CTPI, and PICTPI). The distinct surface charge separation of Example 1 (PCTI), in which photo-generating electrons are captured in Pt on the outer surface of CT and captured photoexcited holes on $IrO_x$ on the CT inner surface, is advantageous for performing the water oxidation-reduction reaction.

Figure 8D:
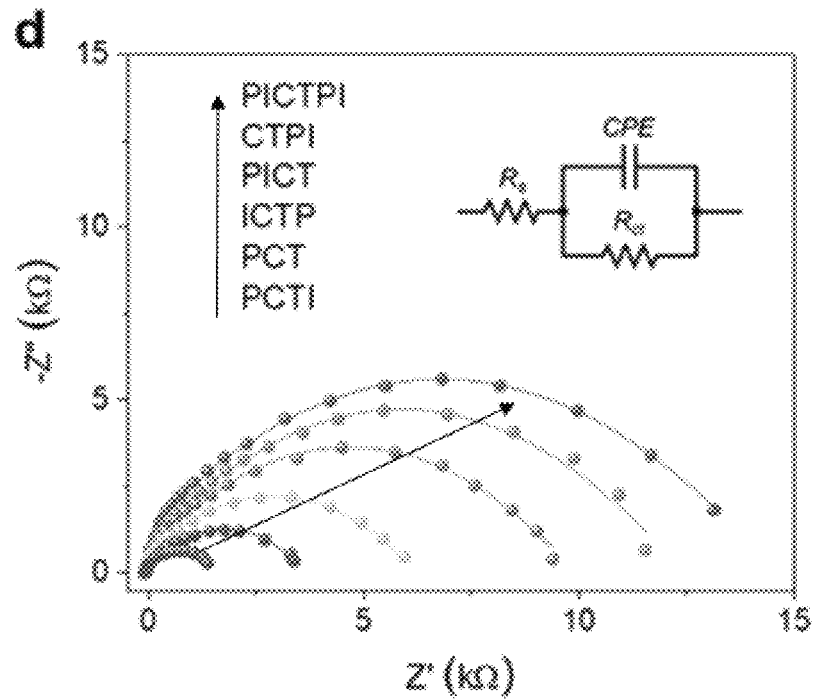
FIG. 8D shows the electrochemical impedance spectroscopy (EIS) Nyquist plot of Example 1 and Comparative Examples 2 and 6 to 9.

FIG. 8D shows the electrochemical impedance spectroscopy (EIS) Nyquist plot of Example 1 and Comparative Examples 2 and 6 to 9. Specifically, it shows the EIS Nyquist plot of the photocatalyst prepared at 0.6 V vs. Ag/AgCl in 0.5 m $Na_2SO_4$ solution under light irradiation. In addition, the drawing inserted in FIG. 8D is an equivalent circuit for a catalyst/electrolyte interface. In the drawing inserted into FIG. 8D, Rs is an electrolyte resistance, and Rct and CPE are charge transfer resistance from a bulk to a photocatalyst surface and a normal device surface, respectively.

According to FIG. 8D, it can be confirmed that Example 1 (PCTI) has a much-reduced charge transfer resistance (Rct=1.52 kΩ) than other catalysts.

Accordingly, as the cocatalyst is spatially separated, Example 1 has the advantage of efficient charge separation and transfer.

Experimental Example 6: Check the Actual Movement of the Charge In-Situ

Figure 9A:
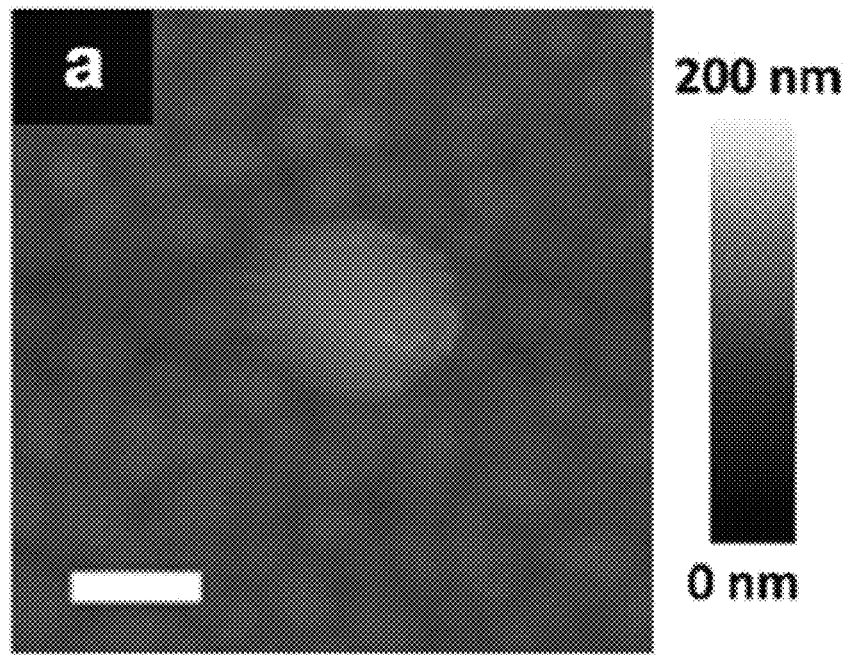
FIG. 9A shows photoassisted Kelvin probe force microscopy (photo-KPFM) topography mapping of Example 1.
Figure 9B:
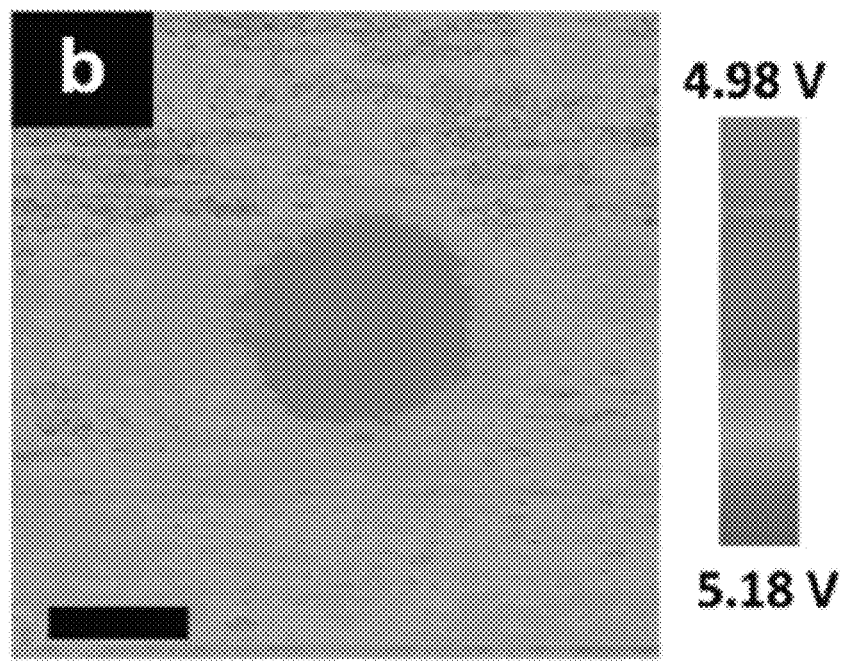
FIG. 9B shows photo-KPFM surface potential (SP) mapping of Example 1 in a dark space.
Figure 9C:
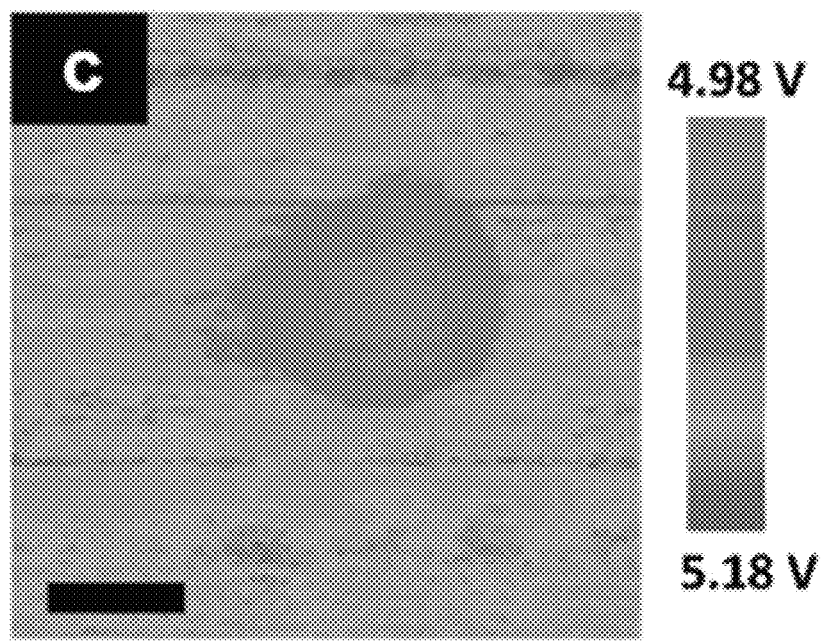
FIG. 9C shows photo-KPFM surface potential (SP) mapping of Example 1 under light irradiation.
Figure 9D:
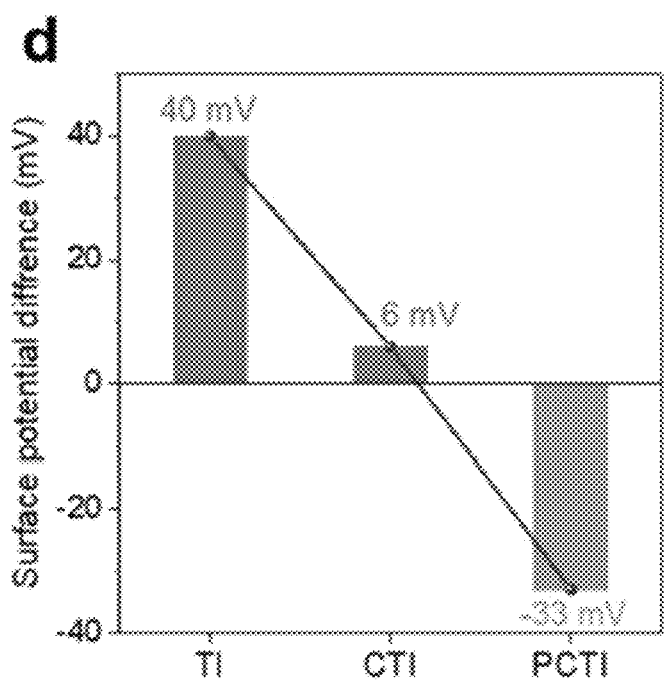
FIG. 9D shows Δsurface potential (SP) calculated according to the structures of $TiO_2$—$IrO_x$ (TI), Comparative Example 5 (CTI), and Example 1 (PCTI).

FIG. 9A shows photo-assisted Kelvin probe force microscopy (photo-KPFM) topography mapping of Example 1. FIG. 9B shows surface potential (SP) mapping of Example 1 in a dark space. FIG. 9C shows the surface potential (SP) mapping of Example 1 under light irradiation and FIG. 9D shows the Δsurface potential (SP) calculated according to the structures of $TiO_2$—$IrO_x$ (TI), Comparative Example 5 (CTI), and Example 1 (PCTI).

According to FIGS. 9A to 9D, the increased SP (ΔSP=40 mV) of $TiO_2$—$IrO_x$ (TI) after light irradiation indicates a decrease in electron density at the surface compared to the dark condition. This indicates that electrons are transferred from the outer $TiO_2$ shell to the inner $IrO_x$ particle due to the large work function of $IrO_x$. However, Comparative Example 2 (CTI), in which $IrO_x$ was loaded after $TiO_2$ formed a heterojunction with g-$C_3N_4$, showed a significant decrease in SP shift (ΔSP=6 mV) compared to $TiO_2$—$IrO_x$ (TI) upon light irradiation. This indicates a decrease in the internal movement of electrons due to Z-scheme charge transfer and accumulation of photoexcited electrons in the outermost g-$C_3N_4$ layer. Example 1 (PCTI) showed a unique negative SP shift (ΔSP=−33 mV) upon light irradiation, indicating that photoexcited electrons moved to the outer PCTI surface, g-$C_3N_4$, and were preferentially captured by the Pt cocatalyst.

Therefore, finally, in Example 1, it may be seen that electrons move in the same manner as the charge transfer process shown in FIG. 1.

The scope of the present disclosure is defined by the following claims rather than the above detailed description, and all changes or modifications derived from the meaning and scope of the claims and their equivalent concepts should be interpreted as falling into the scope of the present disclosure.

What is claimed is:

1. A photocatalyst for water-splitting hydrogen production, the photocatalyst comprising:
   a first cocatalyst core being hollowed and comprising a first cocatalyst including iridium oxide;
   a catalyst layer positioned on the first cocatalyst core and comprising a first catalyst including titanium oxide and a second catalyst including graphitic nitrogen carbide (g-$C_3N_4$); and
   a second cocatalyst layer positioned on the catalyst layer and comprising a second cocatalyst including platinum (Pt).

2. The photocatalyst of claim 1, wherein the first cocatalyst core is hollow and has any one shape selected from the group consisting of a spherical shape, a polygonal shape, a polygonal cone shape, a conical shape, a polygonal columnar shape, a cylindrical shape, and combinations thereof.

3. The photocatalyst of claim 1, wherein the catalyst layer has a Z-scheme heterojunction.

4. The photocatalyst of claim 1, wherein the catalyst layer comprises:
   a first catalyst layer positioned on the first cocatalyst layer and comprising the first catalyst; and
   a second catalyst layer positioned on the first catalyst layer and comprising the second catalyst.

5. The photocatalyst of claim 1, wherein the difference between the conduction band minimum of the first catalyst and the valence band maximum of the second catalyst is in a range of 0.1 to 0.75 eV.

6. The photocatalyst of claim 1, wherein the first cocatalyst is an oxidation cocatalyst, and the second cocatalyst is a reduction cocatalyst.

7. The photocatalyst of claim 6, wherein the photocatalyst comprises 0.5 to 3 parts by weight of the oxidation cocatalyst based on 100 parts by weight of the photocatalyst.

8. The photocatalyst of claim 6, wherein the photocatalyst comprises 0.3 to 3.0 parts by weight of the reduction cocatalyst based on 100 parts by weight of the photocatalyst.

9. The photocatalyst of claim 1, wherein the photocatalyst splits water under light irradiation to produce hydrogen and oxygen.

10. A hydrogen production method comprising:
    (1) dispersing the photocatalyst of claim 1 in water; and
    (2) producing a gas containing hydrogen ($H_2$) by irradiating the water in which the photocatalyst is dispersed with light.

11. The method of claim 10, wherein in the step (2), the gas further comprises oxygen ($O_2$).

12. A method of preparing a catalyst for water-splitting hydrogen production, the method comprising:
    (a) preparing metal oxide nanoparticles including silicon oxide ($SiO_2$);
    (b) forming a first cocatalyst layer comprising a first cocatalyst including iridium oxide on a surface of each of the metal oxide nanoparticles;

(c) forming a catalyst layer comprising a first catalyst including titanium oxide and a second catalyst including graphitic nitrogen carbide (g-$C_3N_4$) on the first cocatalyst layer;

(d) forming a second cocatalyst layer comprising a second cocatalyst including platinum (Pt) on the catalyst layer; and (e) etching the metal oxide nanoparticles to obtain first cocatalyst cores being hollow and comprising the first cocatalyst.

13. The method of claim 12, wherein the step (c) comprises:

(c-1) forming a first catalyst layer comprising the first catalyst on the first cocatalyst layer; and (c-2) forming a second catalyst layer comprising the second catalyst on the first catalyst layer.

14. The method of claim 13, wherein the first cocatalyst is positioned on a portion of a surface of the metal oxide nanoparticles, the first catalyst layer is formed by electrostatic attraction between a surface of the first catalyst and the surface of the metal oxide nanoparticles, and the second catalyst layer is formed by electrostatic attraction between a surface of the second catalyst and the surface of the first catalyst layer.

* * * * *